US012205430B2

(12) United States Patent
Mande et al.

(10) Patent No.: US 12,205,430 B2
(45) **Date of Patent: *Jan. 21, 2025**

(54) MIXED DENOMINATION CASH CASSETTE CURRENCY COUNTER

(71) Applicant: Wells Fargo Bank, N.A., San Francisco, CA (US)

(72) Inventors: Christian Mande, Charlotte, NC (US); Darren Goetz, Salinas, CA (US); Frank DiGangi, San Francisco, CA (US); Dennis Montenegro, Concord, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/202,841

(22) Filed: May 26, 2023

(65) Prior Publication Data

US 2023/0326280 A1 Oct. 12, 2023

Related U.S. Application Data

(63) Continuation of application No. 17/392,697, filed on Aug. 3, 2021, now Pat. No. 11,663,874.

(51) Int. Cl.

*G07D 11/30* (2019.01)
*G07D 11/13* (2019.01)
(Continued)

(52) U.S. Cl.

CPC ............. *G07D 11/30* (2019.01); *G07D 11/13* (2019.01); *G07D 11/165* (2019.01); *G07D 11/23* (2019.01);
(Continued)

(58) Field of Classification Search

CPC ...... G07D 11/30; G07D 11/13; G07D 11/165; G07D 11/23; G07D 11/32; G07D 11/50; G07D 11/12; G07D 11/34; G07F 19/203
See application file for complete search history.

(56) References Cited

U.S. PATENT DOCUMENTS

| | | | |
|---|---|---|---|
| 6,427,998 | B1 | 8/2002 | Norrie et al. |
| 6,443,442 | B1 | 9/2002 | Willis et al. |

(Continued)

FOREIGN PATENT DOCUMENTS

| | | | |
|---|---|---|---|
| CA | 2379865 | C | 11/2011 |
| KR | 20090057704 | A | 6/2009 |
| WO | WO-2012/029397 | A1 | 3/2012 |

*Primary Examiner* — Tuyen K Vo
(74) *Attorney, Agent, or Firm* — Foley & Lardner LLP

(57) ABSTRACT

A host device comprising an input/output (I/O) port, a first sensor, and a non-transitory computer-readable medium comprising instructions stored thereon that, when executed by one or more processors, cause the one or more processors to determine a cassette is docked with the host device, receive a transaction request requiring a specific denomination for dispensing, cause a picker system of the cassette to retrieve a target bill from a storage position of a bill storage component of the cassette based on the specific denomination for the transaction request and a storage position for a bill matching the specific denomination where the cassette is configured to generate a bill list comprising bill information for each bill of the plurality of bills including a respective denomination and the storage position for each bill, and cause the I/O port to dispense the target bill.

20 Claims, 14 Drawing Sheets

(51) Int. Cl.

| | |
|---|---|
| ***G07D 11/165*** | (2019.01) |
| ***G07D 11/23*** | (2019.01) |
| ***G07D 11/32*** | (2019.01) |
| ***G07D 11/50*** | (2019.01) |
| ***G07F 19/00*** | (2006.01) |

(52) U.S. Cl.
CPC ............. *G07D 11/32* (2019.01); *G07D 11/50* (2019.01); *G07F 19/203* (2013.01)

(56) References Cited

U.S. PATENT DOCUMENTS

| | | | | |
|---|---|---|---|---|
| 7,992,775 | B2 * | 8/2011 | Graef | G06Q 20/1085 271/305 |
| 8,317,087 | B1 | 11/2012 | Crews et al. | |
| 8,640,945 | B1 | 2/2014 | McCormick | |
| 8,695,777 | B2 | 4/2014 | Miksic et al. | |
| 10,741,000 | B2 | 8/2020 | Nicol et al. | |
| 2008/0128487 | A1 * | 6/2008 | Graef | G07F 19/202 235/379 |
| 2015/0068863 | A1 | 3/2015 | Blower et al. | |
| 2015/0379491 | A1 | 12/2015 | Ma et al. | |
| 2017/0301171 | A1 * | 10/2017 | Schwartz | G07D 11/28 |
| 2018/0204404 | A1 | 7/2018 | Kokubo et al. | |
| 2021/0272408 | A1 | 9/2021 | Kikuchi | |

* cited by examiner

MIXED DENOMINATION CASH CASSETTE CURRENCY COUNTER

CROSS-REFERENCE TO RELATED APPLICATIONS

This application is a continuation of U.S. patent application Ser. No. 17/392,697 filed Aug. 3, 2021, which is incorporated herein by reference in its entirety and for all purposes.

BACKGROUND

Bill handling machines, such as automated teller machines (ATMs) or cash recycling units at teller stations (e.g., at a financial institution), often utilize cassettes to store bills (e.g., currency, bank notes, etc.). Each of the series of cassettes can be configured to store a particular denomination or type of bill, and may be structured to receive or dispense bills in response to a transaction. An ATM user may withdraw bills from the ATM by entering account information, a bank card, an amount to withdraw, etc., and the ATM may retrieve appropriate bills from one or more cassettes. A teller operating a teller station may deposit bills into the teller station, and these bills may be routed into appropriate cassettes.

The cassettes utilized by ATMs, teller stations, point-of-sale (POS) systems, etc., may be unique to the particular model or type of device, and therefore may not be compatible with other styles, models, or types of devices. A cassette used in a particular model of ATM may not be compatible with a teller station, or vice versa. Additionally, cassettes may lack smart programmable functionality or features.

SUMMARY

One embodiment of the present disclosure is a system. The system includes a cassette, memory and one or more processors. The cassette is structured to manage a plurality of bills and includes a sensor, a bill storage component, and a picker system. The sensor is structured to provide denomination information indicative of a denomination of the plurality of bills. The bill storage component is structured to retrievably store the plurality of bills. The picker system is structured to traverse the bill storage component. The memory and one or more processors are communicatively coupled to the cassette. The memory has stored thereon instructions that, when executed by the one or more processors, cause the one or more processors to determine the denomination of the plurality of bills based on the denomination information provided by the first sensor, generate a bill list comprising bill information for the plurality of bills stored by the bill storage component, the bill information including a denomination and a storage position of each of the plurality of bills, receive a transaction request indicating a specific denomination for dispensing, identify a storage position of a target bill from the bill list that matches the specific denomination of the transaction request, and cause the picker system to traverse the bill storage component to the storage position of the target bill to retrieve the target bill for dispensing.

Another embodiment of the present disclosure is a method that includes detecting, by a sensor of a cassette, denomination information indicative of a denomination of a bill, determining, by one or more processors, the denomination of the bill based on the denomination information detected by the first sensor, generating, by one or more processors, a bill list comprising bill information for a plurality of bills stored by a bill storage component of the cassette, the bill information including a denomination and a storage position of each of the plurality of bills, receiving a transaction request indicating a specific denomination for dispensing, identifying, by one or more processors, a target bill from the bill list matching the specific denomination of the transaction request, and retrieving, by the picker system, the target bill for dispensing.

Yet another embodiment of the present disclosure is computer-readable media having instructions stored thereon that, when executed by one or more processors, cause the one or more processors to perform operations comprising receiving, by a circuit of a cassette from a sensor, denomination information of a plurality of bills, determining a denomination of each of the plurality of bills based on the denomination information, generating a sequential bill list including bill information for the plurality of bills, including a denomination and a storage position of each of the plurality of bills, identifying a position of a target bill out of the bill list based on the denomination of the target bill matching the specific denomination of the transaction request, causing a picker system to traverse a bill storage component of the cassette to the position of the target bill, and causing the picker system to retrieve the target bill.

BRIEF DESCRIPTION OF THE DRAWINGS

Objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Figure 1:
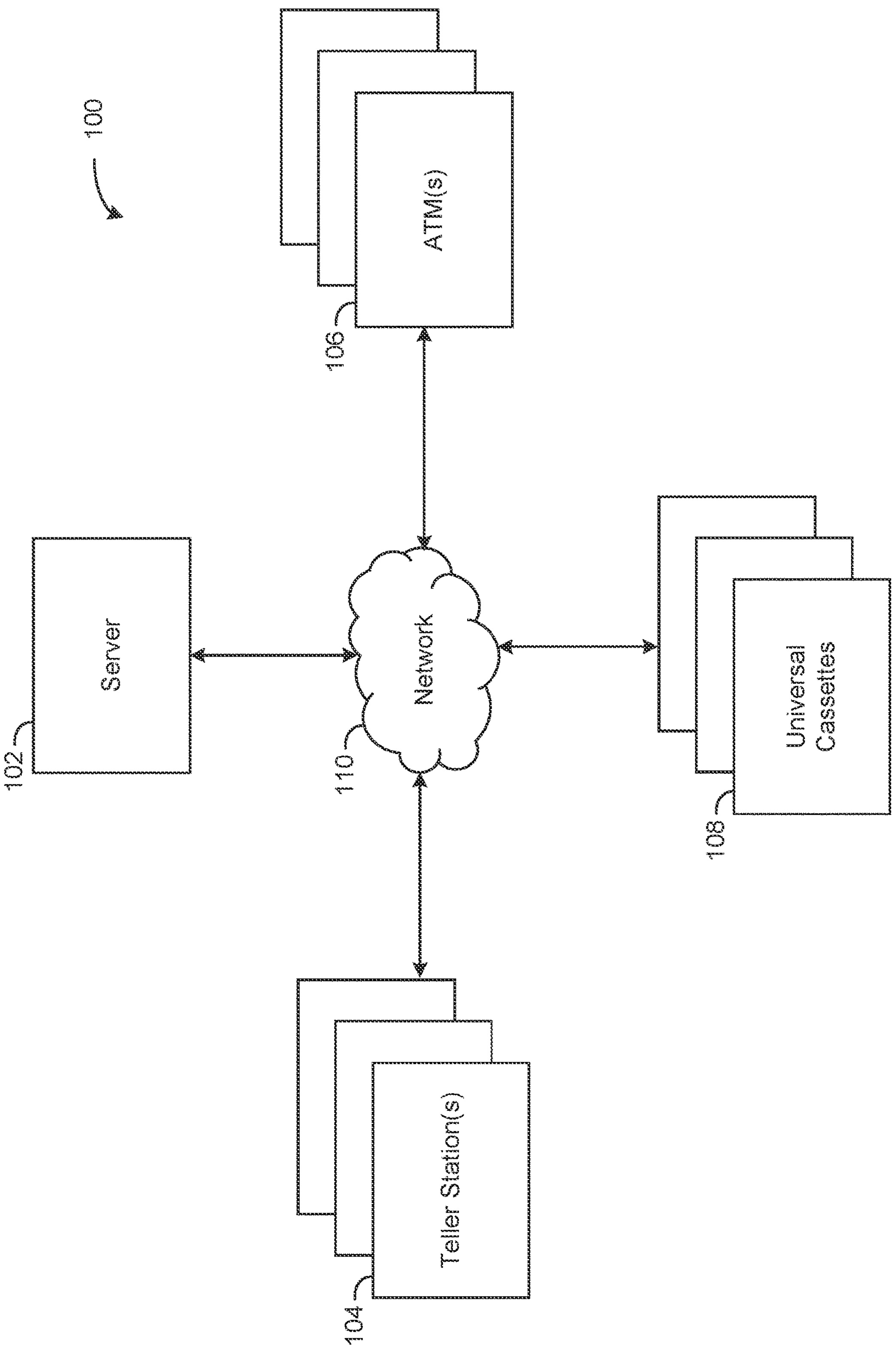
FIG. 1 is a block diagram of a cassette management system, according to some embodiments.

Referring generally to the figures, universal cassettes for receiving and dispensing bills and a cassette management system are shown, according to various embodiments. In particular, the universal cassettes described herein may be docked (i.e., installed, disposed within and/or communicatively coupled to) in various host devices or systems, including various models or types of ATMs, teller stations such as teller counters at banks, cash recyclers, POS systems, etc. In other words, these cassettes are "universal" in that they can be configured to function with a variety of systems. A universal cassette can include a control circuit, which may be embodiment within the cassette in whole or in part (e.g., as an integrated circuit, a system on a chip (SOC), a removable card, etc.). The control circuit can include one or more sensors for detecting bill quality, fill level, location, and various other parameters associated with operations of the universal cassette. The universal cassette can be docked into a host device, such as an ATM, to facilitate the storage and retrieval of bills over a plurality of transactions. The universal cassette may be communicatively and/or electronically coupled to the host device, and the universal cassette and/or the host device may be communicatively coupled to a central computing system (e.g., a remote server), such as a financial institution server.

Together, the universal cassettes, host devices, and central computing system may form a cassette management system, capable of tracking fill levels, denominations, locations, and other information for one or more cassettes. In one example, a branch of a financial institution (e.g., a bank branch) may include at least one ATM and/or at least one teller station with a cash storage system configured to receive or dispense bills to a teller and/or a customer. Over time, the number of bills contained in the multiple cassettes of the ATM may gradually deplete as customers make withdrawals. In a similar manner, cassettes at the teller's station may fill over time, as customers make deposits. The filling and depletion of these cassettes may be tracked by the central computing system based on information provided by the cassettes themselves, such that when a cassette is full (e.g., the teller station cassette which has filled over time) or empty (e.g., the ATM cassette which as depleted over time), the central computing system may identify a replacement cassette. In this example, the central computing system may determine that the empty ATM cassette may be replaced by the full teller station cassette or vice versa.

Upon determining that a first cassette requires replacement, the central computing system may identify, based on a current location of the first cassette, a denomination associated with the first cassette, and/or one or more other attributes of the first cassette, a second, replacement cassette. In the example above, the central computing system may determine that the ATM cassette is nearly empty, and may identify the teller station's cassette as a suitable replacement based on the proximity of the two cassettes (e.g., both cassettes are at the same bank branch). The central computing system may then generate a notification that is presented to a user (e.g., a bank employee) via a user device, such as a computer or mobile device, which provides instructions for the user to swap the first and second cassettes, or at least to replace the first cassette with the second cassette. The user may then remove the first cassette from its host device and replace it with the second cassette. It will be appreciated that various other features and advantages of universal cassettes and the above-mentioned cassette management system will be described in greater detail below.

Referring first to FIG. 1, a block diagram of a cassette management system 100 is shown, according to some embodiments. As described briefly above, system 100 may be configured to track and/or manage a plurality of universal cassettes, such as by determining when one or more cassettes are full, near full, near empty, or empty, and subsequently identifying appropriate replacement cassettes or cassette swaps. In some embodiments, system 100 is implemented at a single location (e.g., a particular branch of a financial institution), although in other embodiments, system 100 may be implemented across multiple locations (e.g., across multiple branches belonging to the same parent company). For example, system 100 may be implemented to manage cassettes across all of the locations (e.g., branches) of a company within a geographical area, region, etc.

System 100 includes a central computing system, shown as server 102, which may be a "main" computing system for a particular company (e.g., a financial institution). In other words, server 102 may be configured to receive, process, and/or transmit data from/to a variety of systems, subsystems, or devices, and accordingly may be able to perform a variety of calculations, processes, estimations, etc., using this data. As described in greater detail below with respect to FIG. 3, server 102 may include a variety of components for executing instructions (e.g., via computer code) to perform these various actions. In some embodiments, server 102 is hosted or maintained by the same company that hosts/maintains the other components of system 100, described in detail below. In other embodiments, server 102 may be a component of a cloud service and/or may be hosted or implemented by a secondary company (e.g., other than the company that monitors/operates the various other components of system 100).

System 100 also includes teller station(s) 104 and automated teller machines (ATM(s)) 106. Teller station(s) 104 (i.e., teller systems) may include a variety of components utilized by a teller (i.e., a bank employee) to conduct transactions with a customer. For example, a teller station 104 can include one or more cash drawers or cassettes, a cash recycler, receipt validators/printers, a user interface, etc., that enable the teller to conduct transactions such as check cashing, deposits (e.g., of checks or bills), transfers, etc. In some embodiments, teller station(s) 104 include at least a user interface and a cash recycler configured to receive, store, and/or dispense bills (e.g., currency). For example, a teller may deposit a plurality of bills into a teller station 104, and teller station 104 may analyze (e.g., for quality/authenticity), count, sanitize, and/or store the bills in a plurality of cassettes. Likewise, teller station 104 may retrieve stored bills in response to a customer requesting funds (e.g., from the teller) by routing the bills from a cassette and through a bill path, to a bill input/output (I/O) slot.

ATM(s) 106 may be specialized devices that allow a user (e.g., a customer) to access an account held at a financial institution, such as to deposit, withdraw, or transfer funds, among other functions. Like teller station(s) 104, ATM(s) 106 may include a user interface and a housing having deposited therein at least one cassette for storing bills; however, in some cases, the housing(s) of ATM(s) 106 may each include multiple cassettes (e.g., for separate denominations of bills). When interacting with an ATM 106, a user may provide account information by inserting or wirelessly providing a bank card and/or may input (e.g., via the user interface) various account details (e.g., username, account number, password, etc.) to access the user's account. If the user wishes to withdraw funds, the user may identify an account to withdraw the funds from and may input a desired withdrawal amount. Upon confirmation/authentication of the user and/or the transaction, ATM 106 may retrieve appropriate bills from the one or more cassettes and may dispense the bills via an I/O slot.

As described herein, both teller station(s) 104 and ATM(s) 106 are examples of host devices, or devices that are configured to house and/or utilize one or more universal cassettes 108. Accordingly, it will be appreciated that the host devices described below can include teller station(s) 104 and ATM(s) 106, but are not limited to only these devices. Other host devices that utilize universal cassettes 108 are also contemplated by the present disclosure. For example, host devices may also include point-of-sale (POS) systems, cash recyclers (e.g., other than in a teller station), vending machines, or any other device that operates by receiving, storing, and/or dispensing bills. Examples of host devices, including teller station(s) 104 and ATM(s) 106, are described in greater detail below with respect to FIG. 4.

As mentioned briefly above, universal cassettes 108 are devices structured for installation or implementation in a host device, and are configured to receive, store, and/or dispense bills. Accordingly, universal cassettes 108 may include a storage area for holding any number of bills. In some embodiments, each of universal cassettes 108 may be configured to store a particular denomination of bill (e.g., only $20 bills). For example, universal cassettes 108 may be preconfigured (e.g., preprogrammed) to be associated with a particular denomination, or may determine an associated denomination of bill during filling or operation. For example, universal cassettes 108 may detect, via one or more sensors, a denomination of a first bill and may record this denomination. In some embodiments, the particular denomination stored by each of universal cassettes 108 may be determined by a position within a host device. For example, a first universal cassette 108 may be docked in a position associated with a particular denomination within the host device. In some embodiments, universal cassettes 108 may be configured to accept multiple denominations.

Universal cassettes 108 may advantageously be structured to work with a variety of different host devices, therefore solving the technical problem of cross-device interoperability. In other words, universal cassettes 108 may be structured for installation in various types, styles, or models of host devices. For example, universal cassettes 108 may be structured to be docked in both teller station(s) 104 and ATM(s) 106, and may be swapped between the two types of devices. Additionally, universal cassettes 108 may include a control circuit to perform a variety of functions not typically handled by a cassette (e.g., for an ATM or cash recycler). For example, universal cassettes 108 may be configured to detect a denomination, quality, and/or authenticity of stored bills, and may also track the number (i.e., amount) or fill level of stored bills. In this manner, it can be determined whether universal cassettes 108 are full, nearly-full, empty, or nearly-empty, and one or more automated actions can be initiated. Additional features and components of universal cassettes 108 are described in greater detail below with respect to FIG. 5.

In some embodiments, universal cassettes 108 may be considered "full" if a fill level of the cassette exceeds a first threshold (e.g., a maximum threshold). Likewise, in some embodiments, universal cassettes 108 may be considered "empty" if a fill level of the cassette exceeds a second threshold (e.g., a minimum threshold). In some embodiments, both a maximum and minimum threshold may be established for a particular cassette. For example, the "full" threshold for a first universal cassette may be 90% capacity, such that the universal cassette is considered full and in need of replacement or emptying once the fill level of the cassette reaches or exceeds 90%. The "empty" threshold for the first universal cassette may be 10% capacity, such that the universal cassette is considered empty and in need of replacement or refilling once the fill level of the cassette reaches or falls below 10%. In some embodiments, additional thresholds may also be set, such as a third threshold representing "nearly-full" (e.g., >80%) and/or a fourth threshold representing "nearly-empty" (e.g., <20%). Thus, it will be appreciated full, nearly-full, empty, or nearly-empty may represent any fill level or threshold, and that multiple thresholds may be established for a particular cassette.

As shown, each of server 102, teller station(s) 104, ATM(s) 106, and universal cassettes 108 may be communicatively coupled to a network 110. Network 110 may be wired or wireless network (e.g., Internet, intranet, VPN, etc.) configured to exchange data, values, instructions, messages, and the like between the components of system 100. Accordingly, each of server 102, teller station(s) 104, ATM(s) 106, and universal cassettes 108 may include an appropriate wired or wireless communications interface (i.e., network adaptor) to facilitate this communication. For example, teller station(s) 104 and/or ATM(s) 106 may communicate with server 102 via a telephone (e.g., cellular) network or a wired local network (e.g., LAN, WAN, etc.). As another example, universal cassettes 108 may communicate with a host device (e.g., teller station(s) 104 and/or ATM(s) 106) via a short-range, wireless network (e.g., WiFi, Bluetooth, etc.). It will be appreciated that these example network types are not intended to be limiting, and that network 110 may be configured as any appropriate type of network. Additionally, in some embodiments, network 110 may include multiple types of networks. For example, ATM(s) 106 and universal cassettes 108 may communicate via a short-range, wireless network, while ATM(s) 106 and server 102 communicate (e.g., simultaneously or nearly-simultaneously) via a wired network.

Figure 2A:
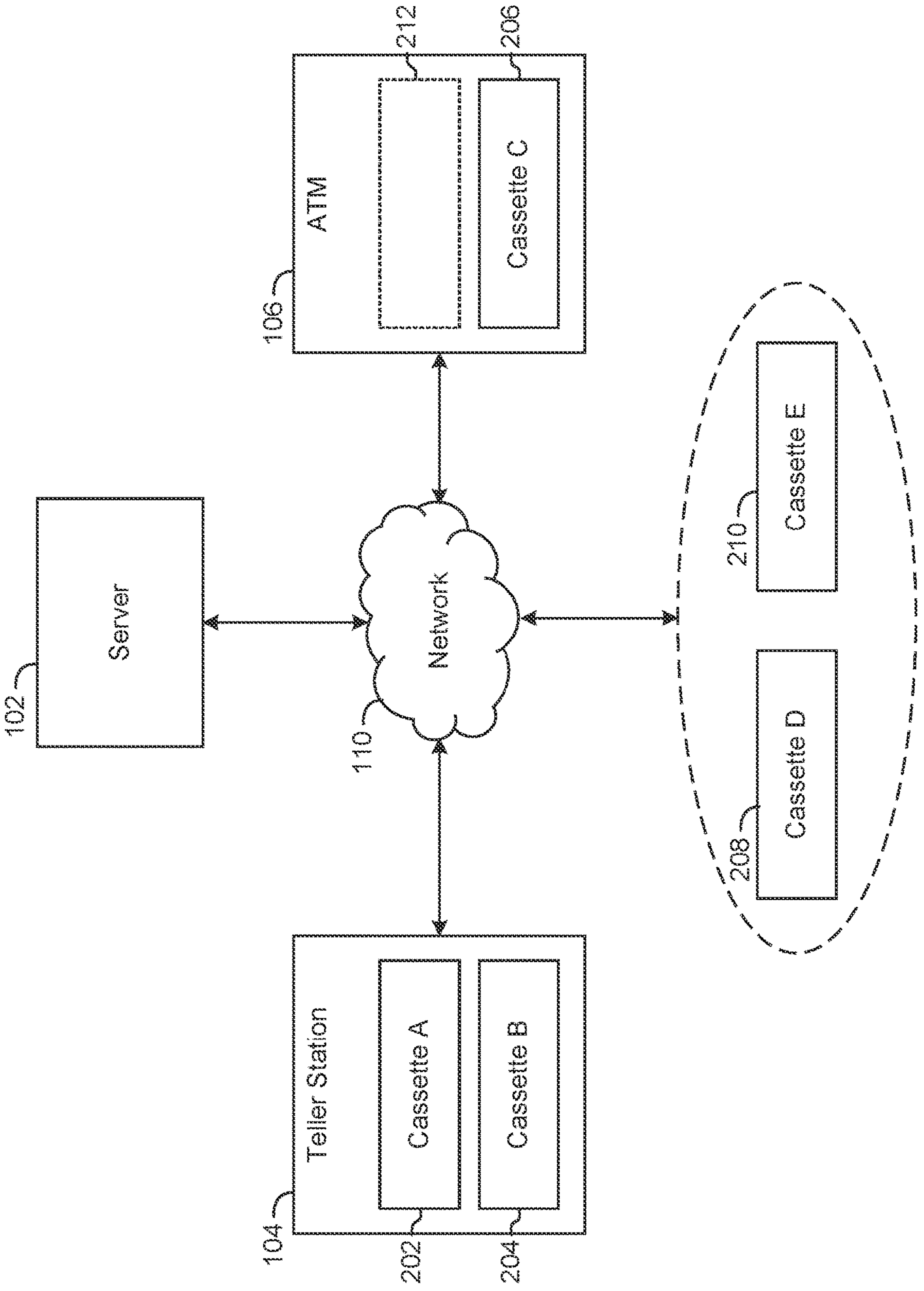
FIGS. 2A and 2B are block diagrams illustrating the operation of the cassette management system of FIG. 1, according to some embodiments.
Figure 2B:
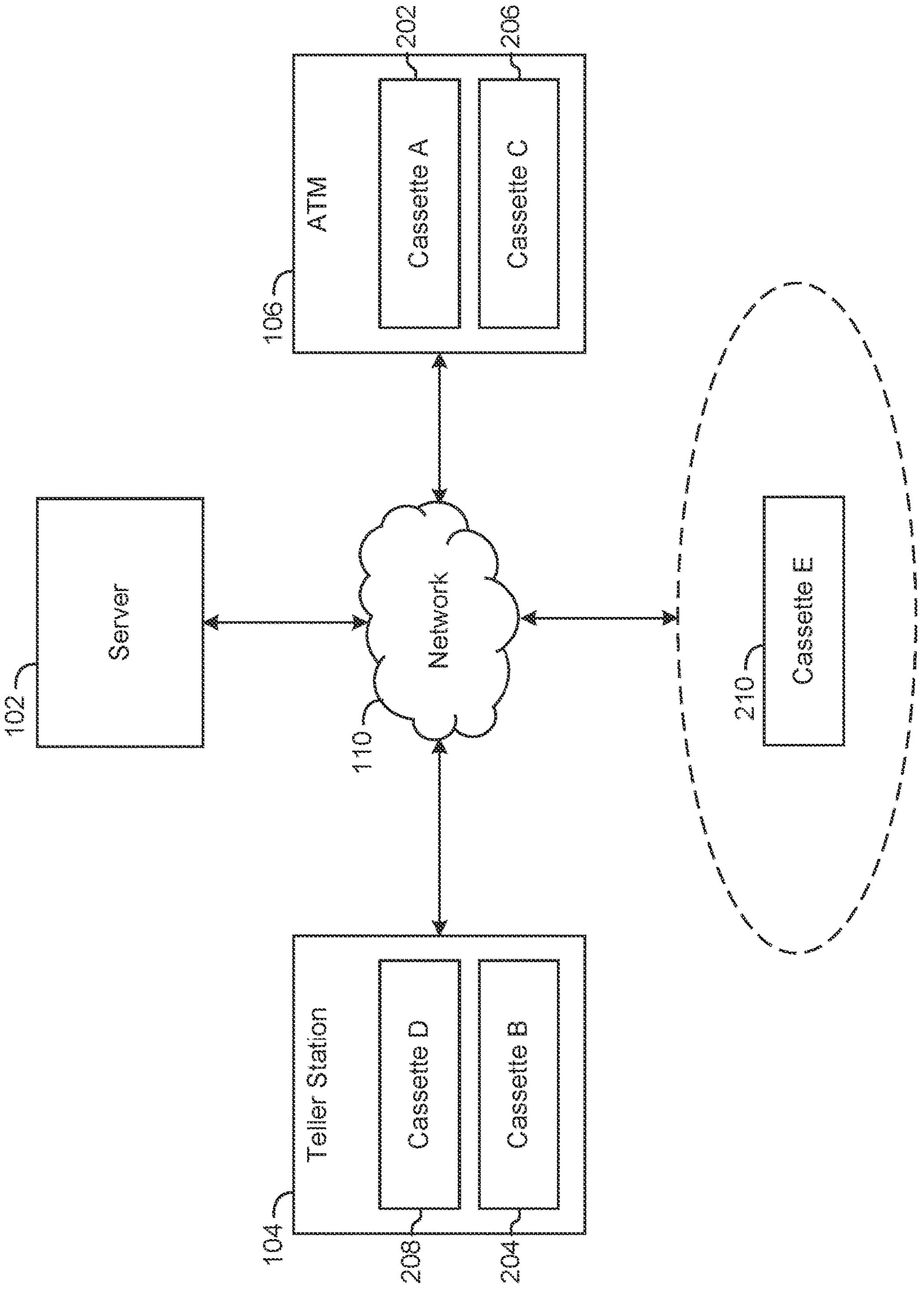

Referring now to FIGS. 2A and 2B, block diagrams illustrating the operation of system 100 are shown, according to some embodiments. More specifically, FIGS. 2A and 2B illustrate the replacement and/or movement of various universal cassettes (e.g., universal cassettes 108) throughout system 100, such as in response to one or more of the cassettes being identified as full or empty or, more generally, in response to the server 102 transmitting (e.g., to a teller station 104, to the ATM 106 when in service mode, to a user within a branch) an indication that a cassette needs to be moved from or to a particular destination (e.g., teller station 104, ATM 106, storage) determined by the server 102 based on information regarding one or more universal cassettes 108. Turning first to FIG. 2A, a teller station 104 is shown to include two universal cassettes 202 and 204, shown as "Cassette A" and "Cassette B," respectively. In some embodiments, teller station 104 may include a cash recycler or other similar device that houses and utilizes these cassettes for storing various bills. For example, cassette 202 may be configured to store a first denomination of bills and cassette 204 may be configured to store a second denomination of bills. It will be appreciated, however, that teller station 104 may include any number of cassettes and is not necessarily limited to the two cassettes shown in the example of FIG. 2A. Further, cassettes can be configured to store bills of mixed denominations.

In a similar manner, ATM 106 is shown to include a cassette 206 ("Cassette C") and an empty cassette slot 212. Like teller station 104, ATM 106 may include any number of cassettes and is not necessarily limited to the two cassettes or cassette slots shown in the example of FIG. 2A. Cassette slot 212 may be configured to receive a universal cassette, but in this example is not populated with a cassette (i.e., a cassette is not yet docked). For example, ATM 106 may be in the process of being stocked (e.g., prior to operation), which is why cassette slot 212 is empty. Additionally, FIG. 2A shows two additional cassettes 208 and 210 ("Cassette D" and "Cassette E," respectively) that are not currently docked in a host device. Cassettes 208 and 210 may be full and/or empty cassettes awaiting installation, and accordingly may be kept in a secure location, such as in a safe room or vault. In some embodiments, cassettes 208 and 210 are docked in a machine or system structured to fill and/or empty cassettes. For example, cassettes 208 and 210 may be docked in a cassette filling system to receive bills for later dispensing and/or to change an internal battery of the cassettes.

In one example, teller station 104 may receive a number of deposits over a period of time (e.g., over a few hours, a day, etc.) and, in turn, one of cassettes 202 or 204 may fill with bills. Once the fill level of cassettes 202 or 204 reaches a threshold (e.g., a maximum pre-set or predetermined fill level, such as a total amount, a height of a stack of bills selected from a range between 100 and 500 millimeters, etc.), the corresponding cassette and/or teller station 104 may generate and transmit (e.g., to server 102) a notification indicating that the cassette is full and in need of replacement. Server 102 may then identify a replacement cassette, in this case a cassette that is empty or near-empty, and may generate a second notification instructing a user (e.g., an employee) to replace the full cassette with the replacement cassette. This process is illustrated in FIG. 2B, where cassette 202, originally docked in teller station 104, may be identified as full (e.g., based on a fill level of the cassette exceeding a predetermined threshold) and may be selected by server 102 for installment into cassette slot 212 of ATM 106.

As shown in FIG. 2B, for example, a sensor in cassette 202 may detect a fill level of the cassette at regular intervals, or immediately following a transaction. Cassette 202 may determine, based on the fill level, that the cassette is nearly full, such as by comparing the fill level to a predetermined threshold, which may be a number of stored bills, a height of a stack of bills, or a fill percentage relative to the maximum fill value. Cassette 202 and/or teller station 104 may transmit a notification identifying cassette 202 and indicating that cassette 202 is nearly full to server 102 (e.g., via network 110) and, in some cases, also indicating a denomination of the bill stored in cassette 202. Server 102 may then identify a replacement cassette from cassettes 204-210 that is suitable for replacing cassette 202. For example, server 102 may identify a cassette that is empty or nearly-empty, that is configured to store a similar denomination of bills as cassette 202, and/or that is within a predefined geographical location with respect to cassette 202. In this case, server 102 may determine that cassette 208 is empty and is located at the same branch as cassette 202 (e.g., cassette 208 is stored in a vault at the same location as teller station 104), and may therefore identify cassette 208 as a replacement for cassette 202.

As shown, server 102 may determine, based on data received from ATM 106, that cassette slot 212 is empty. In some embodiments, server 102 also determines a particular denomination associated with cassette slot 212. For example, cassette slot 212 may require a cassette that stores $20 bills only. Accordingly, a cassette that is prefilled with $20 bills, or a cassette that is capable of storing $20 bills, may be identified. In this case, server 102 may determine that cassette 202, docked in teller station 104 and previously identified as full or nearly-full, is an appropriate cassette for installation in ATM 106.

After identifying a replacement cassette (e.g., cassette 208) for teller station 104 and/or ATM 106, server 102 may generate and transmit (e.g., to a user device such as a computer or mobile device) a notification that instructs (i.e., prompts) a user to replace cassette 202 with cassette 208, as shown in FIG. 2B. Additionally, the same notification or a second notification may instruct the user to install cassette 202 into ATM 106. The notification may be in the form of a pop-up or push notification, an email, a text message, a chat message, an automated phone call, or any other suitable notification. In some embodiments, the notification may be displayed on the ATM or teller station computing device when said ATM or device are in a service mode.

In another example, server 102 may determine that cassette 206 of ATM 106 is empty and that cassette 204 of teller station 104 is full. In some cases, server 102 may also determine that these cassettes are configured to accept a common bill (e.g., most frequently requested and/or dispensed as determined by the server 102) denomination. Server 102 may then generate a notification instructing the user to swap cassettes 204 and 206, such that the full cassette 204 can be used to dispense bills from ATM 106, while the empty cassette 206 can be filled at teller station 104.

Figure 3:
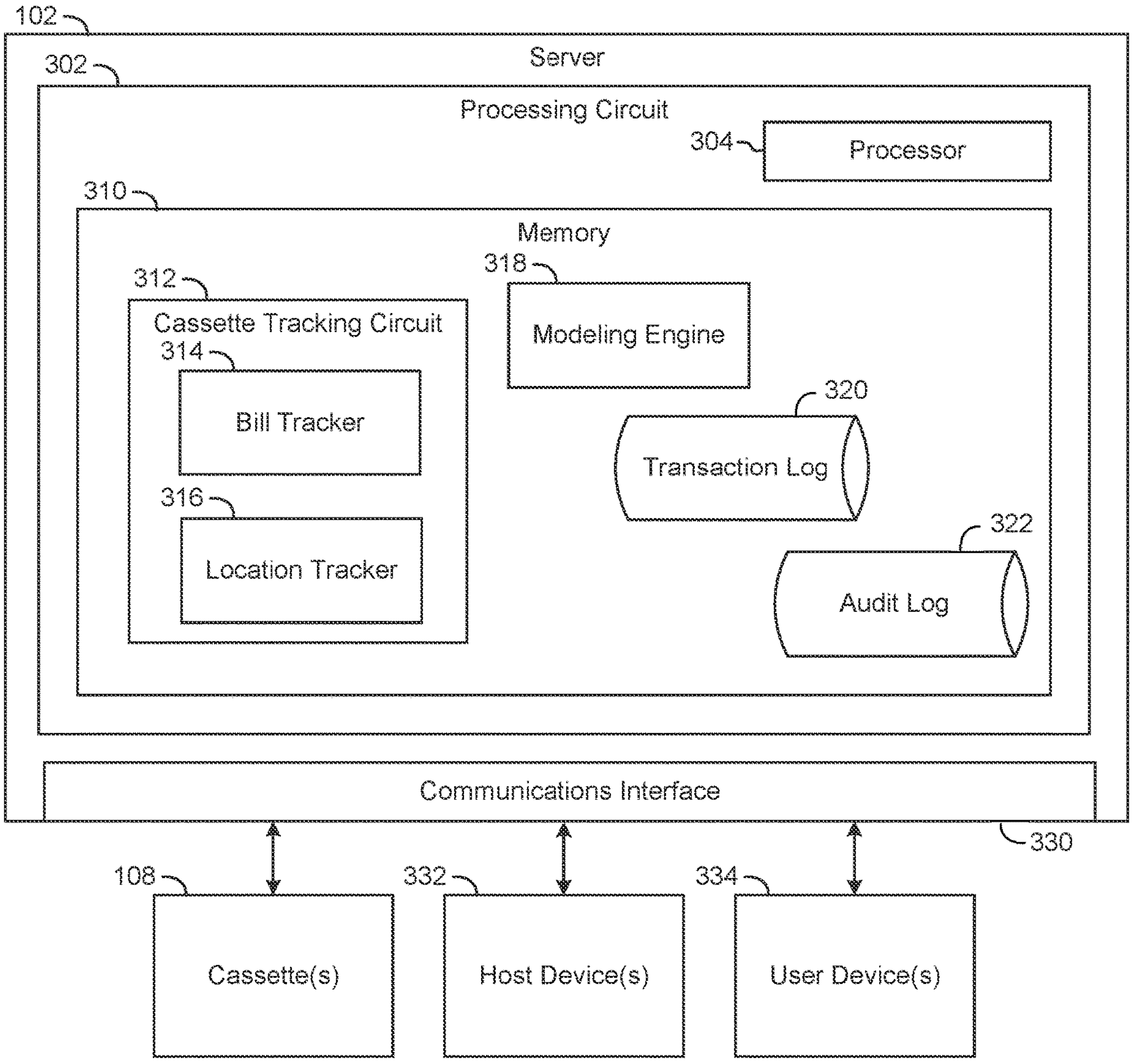
FIG. 3 is a block diagram of the server of the cassette management system of FIG. 1, according to some embodiments.

Referring now to FIG. 3, a detailed block diagram of server 102 is shown, according to some embodiments. As described briefly above, server 102 may be a "main" or central computing system for a company or institution. In some embodiments, server 102 is a remote computing system, not physically co-located with the other components of system 100. For example, server 102 may be a cloud server or other computing device operated (e.g., hosted and/or maintained) by a third party. As another example, server 102 may be physically located at a central branch of a financial institution (e.g., at a headquarters building) rather than at an individual branch. In some embodiments, however, server 102 is a central computing device for a single branch or a group of branches of a company or institution. For example, server 102 may be located at a single branch of a financial institution, and may communicate with equipment local to that branch, and/or at multiple other branches.

Server 102 is shown to include a processing circuit 302 that includes a processor 304 and memory 310. In various embodiments, processor 304 is implemented as a general-purpose processor, an application specific integrated circuit (ASIC), one or more field programmable gate arrays (FPGAs), a digital signal processor (DSP), a group of processing components, or other suitable electronic processing components structured to control the operation of server 102. Memory 310 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 310 may be or include volatile memory or non-volatile memory. Memory 310 may include database components, object code components, script components, or any other type of information structure for supporting the various activities and information structures described in the present application. According to an exemplary embodiment, memory 310 is communicatively connected to processor 304 via processing circuit 302 and includes computer code for executing (e.g., by processing circuit 302 and/or processor 304) one or more processes described herein.

Memory 310 is shown to include a cassette tracking circuit 312 that further includes a bill tracker 314 and a location tracker 316. Together, the components of cassette tracking circuit 312 are configured to track (i.e., monitor) the fill levels, locations, denominations, and any other suitable parameters of a plurality of universal cassettes (e.g., universal cassettes 108). In particular, bill tracker 314 may be configured to track at least a fill level and a denomination associated with each of a plurality of universal cassettes. In some embodiments, bill tracker 314 receives data indicating a fill level and/or a denomination from a universal cassette via a communications interface 330, described in detail below. Specifically, bill tracker 314 may receive fill level and denomination data from universal cassettes 108 at one or more time intervals. For example, bill tracker 314 may receive data in response to a query or request for the data (e.g., bill tracker 314 may transmit a prompt to a cassette), at a regularly scheduled time or interval (e.g., once per day, every 5 minutes, etc.), or continuously (e.g., in real-time, after each transaction).

Location tracker 316 may be configured to track a location of each of the plurality of universal cassettes 108, by receiving location data from the universal cassettes 108 and/or from a host device 332 associated with a universal cassette. Location data may include, for example, a street address, latitude and longitude, information provided by a global positioning system (GPS) transceiver associated with a cassette or host device, or other data that allows server 102 to determine a location of a cassette. In some cases, location data may include identifying information for a host device currently utilizing a universal cassette, such as a location, identification number, model number, etc., of the host device. Like bill tracker 314, location tracker 316 may receive location data once, or at regular time intervals. For example, the locations of universal cassettes 108 may be transmitted or requested when a cassette is docked or undocked, every 30 seconds, every hour, one per day or week, when a cassette power source (e.g., battery) reaches a predetermined depletion threshold (e.g., 5%, 10%), etc.

In addition to fill levels, denominations, and locations of universal cassettes 108, cassette tracking circuit 312 may track (i.e., monitor) various other parameters associated with universal cassettes 108. For example, cassette tracking circuit 312 may receive/retrieve a battery level, maintenance/repair details, transaction details, bill quality information, user access information, and any other parameters that may be provided by a universal cassette. In some embodiments, transaction details from host device(s) 332 and/or universal cassettes 108 may be used to generate transaction logs 320, stored in a database of memory 310. Transaction logs 320 may include information for each transaction processed by a host device/universal cassette, such as a type of transaction, user identifying information, account identifying information, a number of bills withdrawn/deposited, a time and location of the transaction, bill serial number(s) determined via optical character recognition (OCR), check serial number(s) determined via OCR or magnetic ink character recognition (MICR) for cassettes configured to store checks, etc.

Similarly, various other parameters/data may be used to generate audit logs 322. Audit logs 322 may include a variety of information that is required for an audit (e.g., of a financial institution) and/or that may aid in the tracking and security of universal cassettes 108. For example, location data (e.g., including indications of when a cassette is moved), user access data, fill levels, fill/refill times, maintenance/repairs, and other information may be recorded via audit logs 322, such that a user (e.g., an auditor, a branch manager, etc.) can access audit logs 322 at any time to review said information for each of universal cassettes 108.

Memory 310 is also shown to include a modeling engine 318, configured to execute predictive models for simulating operations of system 100. Predictive models are generally mathematical representations of various operations of system 100 that, when executed by server 102 using a set of input values, can predict or estimate an output (e.g., a result). For example, a predictive model may be executed to estimate how quickly a universal cassette is filled, based on historical transaction or fill level data, a location of the universal cassette, etc. Modeling engine 318 may generate and/or execute any type of predictive model, such as neural networks, random forests, decision trees, least squares, etc. Over time, modeling engine 318 may also improve or dynamically update these predictive models as additional data is collected (e.g., by cassette tracking circuit 312).

In some embodiments, modeling engine 318 is configured to predict usage for one or more of universal cassettes 108. For example, based upon a host device that a universal cassette is docked to and/or a location of the universal cassette, modeling engine 318 may be configured to predict how quickly the universal cassette will fill or empty. In this manner, modeling engine 318 may be able to predict and/or generate a projection (schedule) for replacing the universal cassette preemptively (e.g., before it is full or empty).

Likewise, in some embodiments, modeling engine 318 may predict bill requirements based on the location of a host device or a universal cassette. For example, modeling engine 318 may analyze historical data to determine that particular location dispenses a particularly high number of $20 bills each day, such that it may be beneficial to increase the frequency with which the universal cassettes at that location are replaced. As another example, historical data may indicate that an ATM at a specific location experiences in influx in transactions on a certain day or weekend (e.g., corresponding to a particular event, such as a fair, a Friday night in a busy area, etc.). Modeling engine 318 may identify these trends and adjust a schedule or frequency with which universal cassettes 108 are replaced/refilled.

Still referring to FIG. 3, communications interface 330 may be configured for transmitting and receiving various data and signals with other components of system 100. As shown, for example, server 102 can communicate with universal cassettes 108, host devices 332, and user devices 334 via communications interface 330. Accordingly, communications interface 330 can include a wireless network interface (e.g., 802.11X, ZigBee, Bluetooth, Internet, etc.), a wired network interface (e.g., Ethernet, USB, Thunderbolt, etc.), or any combination thereof.

As described above, host devices 332 can include any devices that are configured to house and/or utilize one or more universal cassettes 108. In some embodiments, host devices 332 includes at least teller station(s) 104 (e.g., including cash recyclers) and ATM(s) 106. Other host devices 332 may include point-of-sale (POS) systems, cash recyclers (e.g., other than in a teller station), vending machines, or any other device that operates by receiving, storing, and/or dispensing bills. Host devices 332 are described in greater detail below with respect to FIG. 4.

User devices 334 can include, but are not limited to, mobile phones, electronic tablets, laptops, desktop computers, workstations, and other types of electronic devices. More generally, user devices 334 may include any electronic device that allows a user to interact with server (e.g., through a user interface). Accordingly, each of user devices 334 can include an input device (e.g., a keyboard) and an output device (e.g., a screen). In one example, user device 334 is a computer that provides user access to the operations of server 102 to allow the user to view operating, transaction, or audit data (e.g., cassette locations and fill levels, predicted future bill requirements, audit logs 322, etc.), change various settings or parameters of server 102, and/or provide user-defined control inputs to control operations of the server 102.

Figure 4:
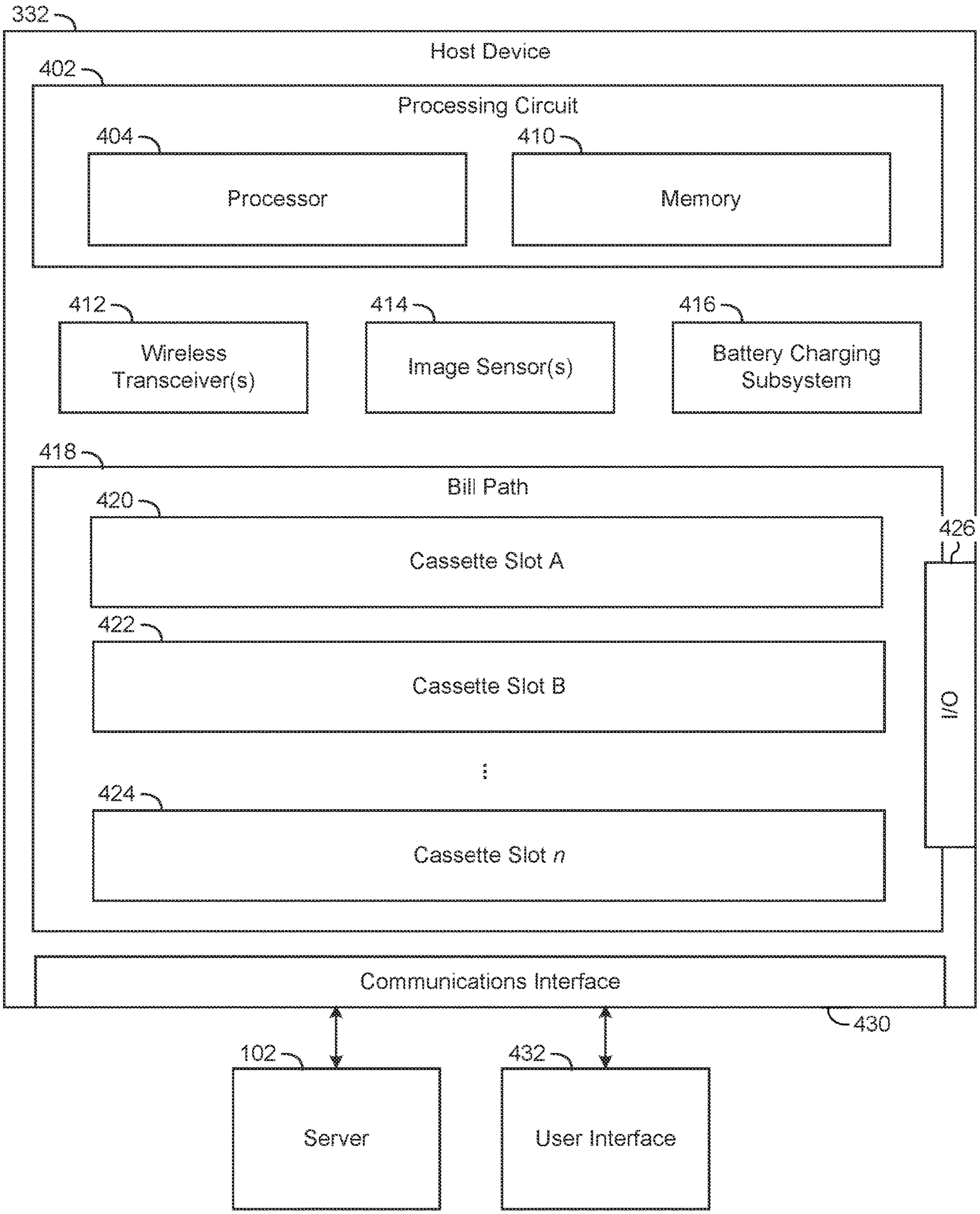
FIG. 4 is a block diagram of a host device for a universal cassette, such as the teller stations or ATMs in the cassette management system of FIG. 1, according to some embodiments.

Referring now to FIG. 4, a detailed block diagram of a host device (e.g., one of host device(s) 332) is shown, according to some embodiments. As described above, a host device may be any device configured to house and/or utilized universal cassettes 108. For example, host device 332 may represent an ATM (e.g., ATM 106), a teller station (e.g., teller station 104), a cash recycler, a POS system, a vending machine, or any other device that contains one or more cassettes for receiving or dispensing bills.

Like server 102, host device 332 includes a communication interface 430 configured for transmitting and receiving various data and signals with other components of system 100. As shown, for example, host device 332 can communicate with at least server 102 and a user interface 432 via communications interface 430. Accordingly, communications interface 430 can include a wireless network interface (e.g., 802.11X, ZigBee, Bluetooth, Internet, etc.), a wired network interface (e.g., Ethernet, USB, Thunderbolt, etc.), or any combination thereof.

User interface 432 can include an input device (e.g., a keyboard) and an output device (e.g., a screen) to allow a user to interact with host device 332. In some embodiments, user interface 432 may be part of a user device (e.g., user device 334), such as a mobile phone, electronic tablet, laptop, desktop computer, workstation, and other type of electronic device. In other embodiments, user interface 432 is a screen and input device of host device 332 itself. In an example where host device 332 is an ATM (e.g., ATM 106), user interface 432 may be a screen of the ATM, a number pad, and/or one or more additional keys for performing various functions, such as completing a transaction. In this example, a user (e.g., a customer) may use user interface 432 to input account information (e.g., a PIN) and transaction information (e.g., a type of transaction, an amount to deposit/withdraw, etc.), as well as to view information such as an account balance.

Still referring to FIG. 4, host device 332 is also shown to include a processing circuit 402 that includes a processor 404 and memory 410. In various embodiments, processor 404 is implemented as a general-purpose processor, an application specific integrated circuit (ASIC), one or more field programmable gate arrays (FPGAs), a digital signal processor (DSP), a group of processing components, or other suitable electronic processing components structured to control the operations of host device 332. Memory 410 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 410 may be or include volatile memory or non-volatile memory. Memory 410 may include database components, object code components, script components, or any other type of information structure for supporting the various activities and information structures described in the present application. According to an exemplary embodiment, memory 410 is communicatively connected to processor 404 via processing circuit 402 and includes computer code for executing (e.g., by processing circuit 402 and/or processor 404) one or more processes described herein.

Host device 332 is also shown to include one or more wireless transceivers 412. Wireless transceivers 412 may include any device configured to transmit and receive wireless data or signals. For example, wireless transceivers 412 may include one or more components for communicating via VHF or UHF radio waves. In some embodiments, wireless transceivers 412 include at least a long-range and a short-range style transceiver, although in other embodiments, wireless transceivers 412 include either a long or short-range transceiver. In some embodiments, wireless transceivers 412 include at least one of a WiFi, Bluetooth®, or radio-frequency identification (RFID) transceiver. It will be appreciated, however, that wireless transceivers 412 are not limited to just these examples of wireless transceiver devices/technologies, and that any type of wireless transceiver may be included in host device 332. In some embodiments, wireless transceivers 412 may also be coupled to, or a portion of, communications interface 430. For example, a WiFi transceiver may be utilized to communicate with other components of system 100 via communications interface 430.

Host device 332 is also shown to include image sensors 414 configured to capture image data. More specifically, image sensors 414 may be configured to read QR codes, barcodes, or other similar identification tags, such as to identify a universal cassette docked into host device 332. Accordingly, image sensors 414 may include a light source, one or more lenses, and sensors for receiving optical pulses or other image data. However, image sensors 414 may also include any other components sufficient to read said identification tags. In one example, image sensors 414 include at least a QR code scanner and/or a barcode reader for scanning and interpreting QR codes or barcodes attached to an outer housing/shell of a universal cassette.

By scanning said identification tags, host device 332 may determine that a universal cassette is docked and may also determine additional information regarding the universal cassette. For example, host device 332 may determine an identification code for a universal cassette, and may transmit the code or send a request to server 102. Server 102 may respond by sending data such as a name or identifier for the cassette, parameters associated with the cassette (e.g., denomination, fill level, etc.), and any other information related to the identified cassette. In some embodiments, server 102 may also update a database (e.g., transaction logs 320 and/or audit logs 322) once a notification and/or identification code for a cassette is received, in order to track the cassettes. In some embodiments, to maintain a closed cash cycle within a branch, the server 102 may maintain a database of cassettes cross-referenced to particular allowable locations (e.g., host device identifiers, geographical area). The host device 332 may be structured to transmit this information, when a particular cassette is docked, to the server 102, and the server 102 may, based on cross-referencing this information to the database, generate an electronic message to the host device 332 to accept or reject a particular cassette.

Host device 332 is also shown to include a battery charging subsystem 416. Battery charging subsystem 416 may include one or more components configured to charge a battery of a docked universal cassette. In particular, battery charging subsystem 416 may include an interface or electrical connector for electrically coupling a battery of a universal cassette to battery charging subsystem 416, and may also include a circuit for monitoring and controlling the charging of the universal cassette. For example, battery charging subsystem 416 may include a battery management system (BMS) for monitoring charge levels of each of one or more universal cassettes 108 docked into host device 332, and for controlling the charging of the one or more universal cassettes 108 (e.g., by limiting charge speed and power). It will be appreciated that battery charging subsystem 416 may be an optional component of host device 332 not included in systems where universal cassettes 108 do not include internal batteries.

During a transaction, a user (e.g., a bank customer, a teller, etc.) may insert or withdraw bills from an I/O port 426. I/O port 426 may be a unidirectional or bidirectional port or slot, configured to receive and/or dispense bills. Bills being deposited, for example, may be received via I/O port 426 and may travel along a bill path 418. Bill path 418 may include a series of gears, rollers, belts, motors, tracks, etc., for transporting bills between components of host device 332. Specifically, bills may be transported from/to I/O port 426 to one of a series of cassettes docked into a plurality of cassette slots 420-424.

As shown, host device 332 may include any number of cassette slots, configured to receive a universal cassette (e.g., one of universal cassettes 108). In other words, a cassette slot may be a "dock" for a universal cassette, and may include a series of connections for electronically or communicatively coupling the universal cassette to host device 332. As an example, a universal cassette may be removably docked into cassette slot 420 ("Cassette Slot A"), thereby allowing bills to be stored in the docked cassette. In some embodiments, each of cassette slots 420-424 are associated with a different denomination or type of bill. For example, cassette slot 422 ("Cassette Slot B") may be associated with $10 bills; therefore, a universal cassette docked into cassette slot 422 may be configured to store $10 bills either before or during installation.

Figure 5:
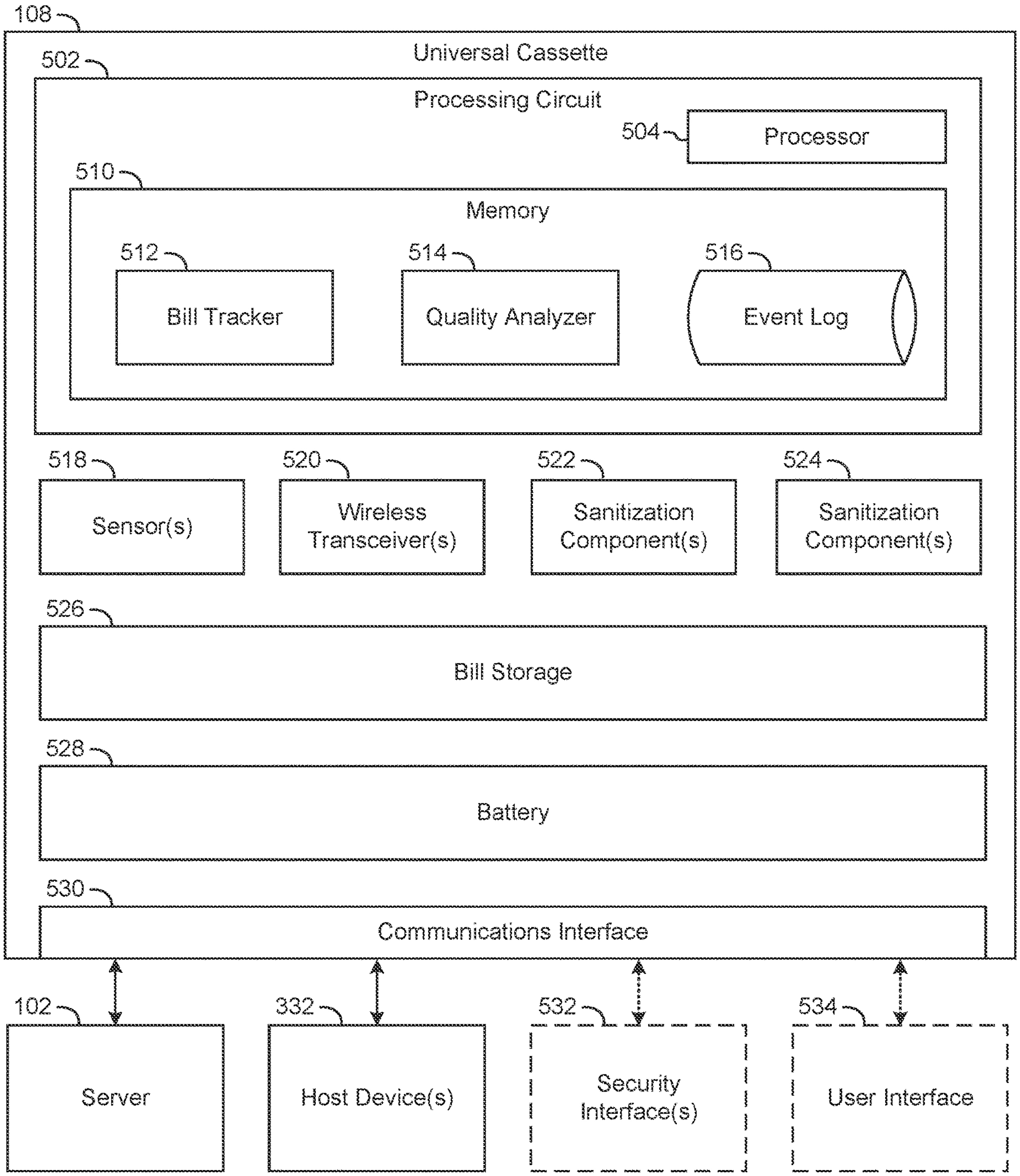
FIG. 5 is a block diagram of a universal cassette, such as the universal cassette included in the cassette management system of FIG. 1, according to some embodiments.

Referring now to FIG. 5, a detailed block diagram of a universal cassette 108 (i.e., one of universal cassettes 108) is shown, according to some embodiments. As mentioned above, universal cassette 108 may advantageously be utilized in multiple systems (e.g., ATMs, teller stations, POS systems, etc.) and may also include smart functionality not found in other types of cassettes. For example, universal cassette 108 may be configured to track a number of stored bills and can determine its current location, which can be transmitted to the other components of system 100 for accurate cassette tracking. Additionally, universal cassette 108 can alert server 102 when a bill storage area is full, nearly full, nearly empty, or empty, allowing server 102 to automatically identify a replacement cassette.

Like server 102 and host device 332, universal cassette 108 includes a communication interface 530 configured for transmitting and receiving various data and signals with other components of system 100. As shown, for example, universal cassette 108 can communicate with at least server 102 and host device 332 via communications interface 530. Accordingly, communications interface 530 can include a wireless network interface (e.g., 802.11X, ZigBee, Bluetooth, Internet, etc.), a wired network interface (e.g., Ethernet, USB, Thunderbolt, etc.), or any combination thereof.

In some embodiments, universal cassette 108 may also communicate with additional components such as security interfaces 532 and/or a user interface 534. It will be appreciated, however, that security interfaces 532 and/or user interface 534 may be optional components depending on an embodiment of universal cassette 108. Security interfaces 532 may include any of a number of components or devices for controlling access/entry to universal cassette 108, and in particular to a bill storage area (e.g., bill storage 526) of universal cassette 108. In particular, security interfaces 532 may include finger print scanners, a number pad, an electronic lock, an identification card reader, a biometrics scanner, or any other interfaces that allow a user to input security/access information. Security interfaces 532 may operate cooperatively with security manager 524, described in detail below, to restrict, track, and/or control access to universal cassette 108.

Security manager 524 may analyze inputs to security interfaces 532 in order to identify users (e.g., attempting to access or manipulate universal cassette 108) and authorize access. Security manager 524 may be configured to receive user identification data, such as a username, password, PIN, access card number, or other information entered via security interfaces 532 or user interface 534. As an example, a user may transmit a lock code electronically, via an e-lock on the user's mobile device, to security interfaces 532. Security manager 524 may interpret the lock code and grant or deny access to universal cassette 108. In some embodiments, security manager 524 may communicate (e.g., via communications interface 530) with server 102 to access a central authentication or access system that maintains user records. For example, security manager 524 may transmit identifying information for a user attempting to access universal cassette 108 (e.g., an ID number, a name, etc.) to server 102, and server 102 may access an authentication system to verify the user's details. Assuming the user can be authenticated, server 102 may transmit a notification back to universal cassette 108, causing universal cassette 108 to grant the user access.

In some embodiments, security interfaces 532 described above include at least a manual or electronic lock configured to restrict access to bill storage 526. In some such embodiments, universal cassette 108 may remain locked when not docked to a host device to prevent unauthorized access. In some embodiments, security manager 524 may be configured to track access to universal cassette 108 and/or bill storage 526, such as by determining and recording when a key, access code, etc., is inserted/entered to unlock the cassette. Security manager 524 may be configured update event log 516 each time universal cassette 108 is unlocked, in order to track any opening of the cassette or access to bill storage 526.

User interface 534 can include an input device (e.g., a keyboard) and an output device (e.g., a screen) to allow a user to interact with universal cassette 108. For example, user interface 534 may include a screen and a number or keypad that allows a user to interact directly with universal cassette 108. In some embodiments, one or more components of user interface 534 may also be utilized as security interface 532. For example, a user may interact with a number pad of user interface 534 to enter a PIN or security access code.

Still referring to FIG. 5, universal cassette 108 is shown to include a processing circuit 502 that includes a processor 504 and memory 510. Together with the other components of universal cassette 108, described in detail below, processing circuit 502, processor 504, and memory 510 form at least a portion of a control circuit for universal cassette 108. In various embodiments, processor 504 is implemented as a general-purpose processor, an application specific integrated circuit (ASIC), one or more field programmable gate arrays (FPGAs), a digital signal processor (DSP), a group of processing components, or other suitable electronic processing components structured to control the operations of universal cassette 108.

Memory 510 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 510 may be or include volatile memory or non-volatile memory. Memory 510 may include database components, object code components, script components, or any other type of information structure for supporting the various activities and information structures described in the present application. According to an exemplary embodiment, memory 510 is communicatively connected to processor 504 via processing circuit 502 and includes computer code for executing (e.g., by processing circuit 502 and/or processor 504) one or more processes described herein.

Memory 510 is shown to include a bill tracker 512, configured to track a number of bills stored in bill storage 526 and/or to determine a fill level of the cassette (e.g., the fill level of bill storage 526). In particular, bill tracker 512 may receive data from one or more sensors 518 that indicates a fill level of bill storage 526, and may track the fill level and/or the number of bills over time. Sensors 518 may include any of a plurality of sensors for measuring various parameters associated with the operations of universal cassette 108. In this case, sensors 518 may include an optical sensor or other similar sensor that can count each bill as it is deposited into or retrieved from bill storage 526. For example, as bills pass said sensor, bill tracker 512 may add or subtract from a count of the total number of bills in bill storage 526.

In some embodiments, sensors 518 includes a fill sensor, configured to measure a height of a stack of bills in bill storage 526, or to otherwise measure a fill level of bill storage 526. In such embodiments, the fill sensor may include one or more switches, an optical sensor, or any other suitable sensor that can determine the fill level or dimensions of the stack of bills in bill storage 526. Bill tracker 512 may determine a fill level of bill storage 526 based on data from sensors 518, and can track the fill level over time. In some embodiments, sensors 518 can include multiple sensors for both counting a number of bills in bill storage 526 and for determining the fill level of bill storage 526.

In some cases, it may be advantageous to track both the bill count and fill level of universal cassette 108, because bills often vary in dimensions between locations (e.g., regions, countries, states, climates, etc.), and based on age or quality. For example, well worn, old, or used bills may be significantly thicker than brand new bills, meaning that fewer bills can fit in bill storage 526. Similarly, bills may be slightly thicker in areas with high humidity when compared to bills in areas of low humidity. Accordingly, a count of the bills as they enter/exit universal cassette 108 and a fill level of bill storage 526 can be used together to determine how many bills will fit in bill storage 526 and/or to determine when bill storage 526 is nearing full or empty.

In some embodiments, bill tracker 512 may constantly or at least regularly adjust a threshold (i.e., limit) indicating that bill storage 526 is full, nearly full, nearly empty, or empty, based on sensor 518 data. For example, bill tracker 512 may compare bill counts and fill levels at regular time intervals (e.g., every few minutes, once per day, etc.) to learn the quality and size of the bills in a current location. This knowledge of bill thickness, counts, fill levels, etc., can be used to adjust the threshold for universal cassette 108 in real-time or near real time, making universal cassette 108 much more flexible than other cassettes by more accurately tracking fill levels.

In some embodiments, bill tracker 512 may operate cooperatively with a quality analyzer 514, which may also utilize data from one or more sensors 518 to determine various bill quality parameters. In this case, sensors 518 may include sensors that measure an age or condition of incoming bills, and may also include sensors that determine the authenticity of the bills. For example, optical sensors or other appropriate sensors can scan passing bills (e.g., entering bill storage 526) to detect counterfeit bills and/or to detect non-recyclable bills (i.e., bills that are too old or worn for recirculation). Quality analyzer 514 may also determine, based on the sensor data, dimensions of the bills (e.g., thickness), which may be used to determine the number of bills that can be stored in bill storage 526 before reaching the threshold.

In some embodiments, quality analyzer 514 may detect non-recyclable (e.g., counterfeit, worn, etc.) bills, and may transmit an alert to host device 332 and/or server 102. In such embodiments, host device 332 may alter a transportation path of the non-recyclable bills, such as by routing the bills to a cassette specifically allocated for holding non-recyclable bills. In some embodiments, such as when counterfeit bills are detected, quality analyzer may alert server 102, which may cause server 102 to save transaction details for additional investigation.

In some embodiments, certain sensors 518 may be mounted on, or a part of, host device 332 rather than universal cassette 108. In such embodiments, host device 332 and universal cassette 108 may share sensor data, allowing universal cassette 108 to utilize these external sensors to perform its various functions. It will also be appreciated that sensors 518 may include any number of additional sensors not described herein. For example, sensors 518 may also include sensors for detecting a battery level of battery 528 and sensors for identifying bill denominations.

Still referring to FIG. 5, memory 510 is also shown to include (e.g., retrievably store) an event log 516 for recording transaction and event data. Specifically, event log 516 may store transaction, bill count, fill level, and/or bill quality details, as well as storing records of universal cassette 108's geographical location, battery levels, maintenance events, etc. In other words, event log 516 may act as an audit log for an individual cassette, tracking any and all event that occur before, during, and after installing universal cassette 108 in a host device.

In some embodiments, event log 516 may record a date, time, location, host device identification, and other suitable information each time universal cassette 108 is docked into a host device, or each time universal cassette 108 is moved. Event log 516 may also record a date, time, location, user ID, and other information each time universal cassette 108 is accessed by a user, such as to empty or fill bill storage 526, or to service universal cassette 108. For example, a log may be created each time universal cassette 108 is service, maintained, or calibrated, to ensure that universal cassette 108 is operating correctly and accurately.

Still referring to FIG. 5, universal cassette 108 is shown to include wireless transceivers 520. Like wireless transceivers 412 of host device 332, wireless transceivers 520 may include any device configured to transmit and receive wireless data or signals. For example, wireless transceivers 520 may include one or more components for communicating via VHF or UHF radio waves. In some embodiments, wireless transceivers 520 include at least a long-range and a short-range style transceiver, although in other embodiments, wireless transceivers 520 include either a long or short-range transceiver. In some embodiments, wireless transceivers 520 include at least one of a WiFi, Bluetooth®, a cellular, or radio-frequency identification (RFID) transceiver. It will be appreciated, however, that wireless transceivers 520 are not limited to just these examples of wireless transceiver devices/technologies, and that any type of wireless transceiver may be included in universal cassette 108. In some embodiments, wireless transceivers 520 may also be coupled to, or a portion of, communications interface 530. For example, a WiFi transceiver may be utilized to communicate with other components of system 100 via communications interface 530.

In some embodiments, wireless transceivers 520 also include one or more devices or components for detecting a location of universal cassette 108. In such embodiments, wireless transceivers 520 can include a GPS transceiver configured to detect a geographical location (e.g., latitude and longitude) of universal cassette 108 in real or near-real time. In some embodiments, wireless transceivers 520 include cellular transceivers for exchanging wireless data with one or more cellular towers. In such embodiments, a location of universal cassette 108 may be determined based on a nearby tower or towers, such as by using triangulation based on the coordinates of one or more cellular towers. However, in other embodiments, a location of universal cassette 108 is determined based on a connected host device. For example, universal cassette 108 may lack components for determine its location, and may instead determine a location based on the connected host device.

In some embodiments, universal cassette 108 includes sanitation components 522. Sanitation components may include one or more devices for sanitizing or otherwise cleaning incoming or stored bills. For example, sanitation components 522 can include an ultra-violet (UV) light source, such as UV-C LEDs, that may irradiate bills before or during storage. Sanitation components 522 are generally configured to kill or deactivate harmful bacteria or viruses that may be present on the surface of bills.

As briefly mentioned above, universal cassette 108 may also include battery 528 for powering the various components described above. Battery 528 may be any suitable rechargeable or replaceable battery, structured to provide a sufficient amount of power to operate the components of universal cassette 108. For example, battery 528 may be a rechargeable NiCad, NiMH, or li-ion battery. In some embodiments, when universal cassette 108 is docked into host device 332, battery 528 may be recharged via battery charging subsystem 416. In other embodiments, battery 528 is recharged via a separate or external battery charging system. For example, battery 528 may be recharged when universal cassette 108 is docked into an external refilling/docking station. Battery 528 may be capable of providing power to universal cassette 108 for at least a predetermined amount of time. For example, battery 528 may be sized to provide at least eight hours of power before being recharged, over even multiple weeks of power. Advantageously, this allows universal cassette 108 to operate without being docked to a host device, such as by sending location updates at regular intervals when a cassette is in transit In some embodiments, when not docked into a host device, universal cassette 108 sends location data and/or a battery level indication to server 102 at regular intervals. For example, universal cassette 108 may transmit location and battery data every hour when not connected to a host device. In some embodiments, universal cassette 108 may also transmit a notification to server 102 when the cassette is undocked from a host device, and/or when universal cassette 108 is undocked for a predetermined length of time. For example, universal cassette 108 may transmit an alert, including at least location data, if universal cassette 108 is undocked from a host device for more than five minutes.

Although not shown in FIG. 5, universal cassette 108 may also include a QR code, bar code, and/or RFID tag, used to detect universal cassette 108 (e.g., during or after installation into a host device) and to identify a variety of information about universal cassette 108. Said codes or tags may be positioned on an outer housing or shell of universal cassette 108, for example, such that wireless transceivers 412 and/or image sensors 414 of host device 332 can read/scan the codes during installation or docking of universal cassette 108.

Figure 6:
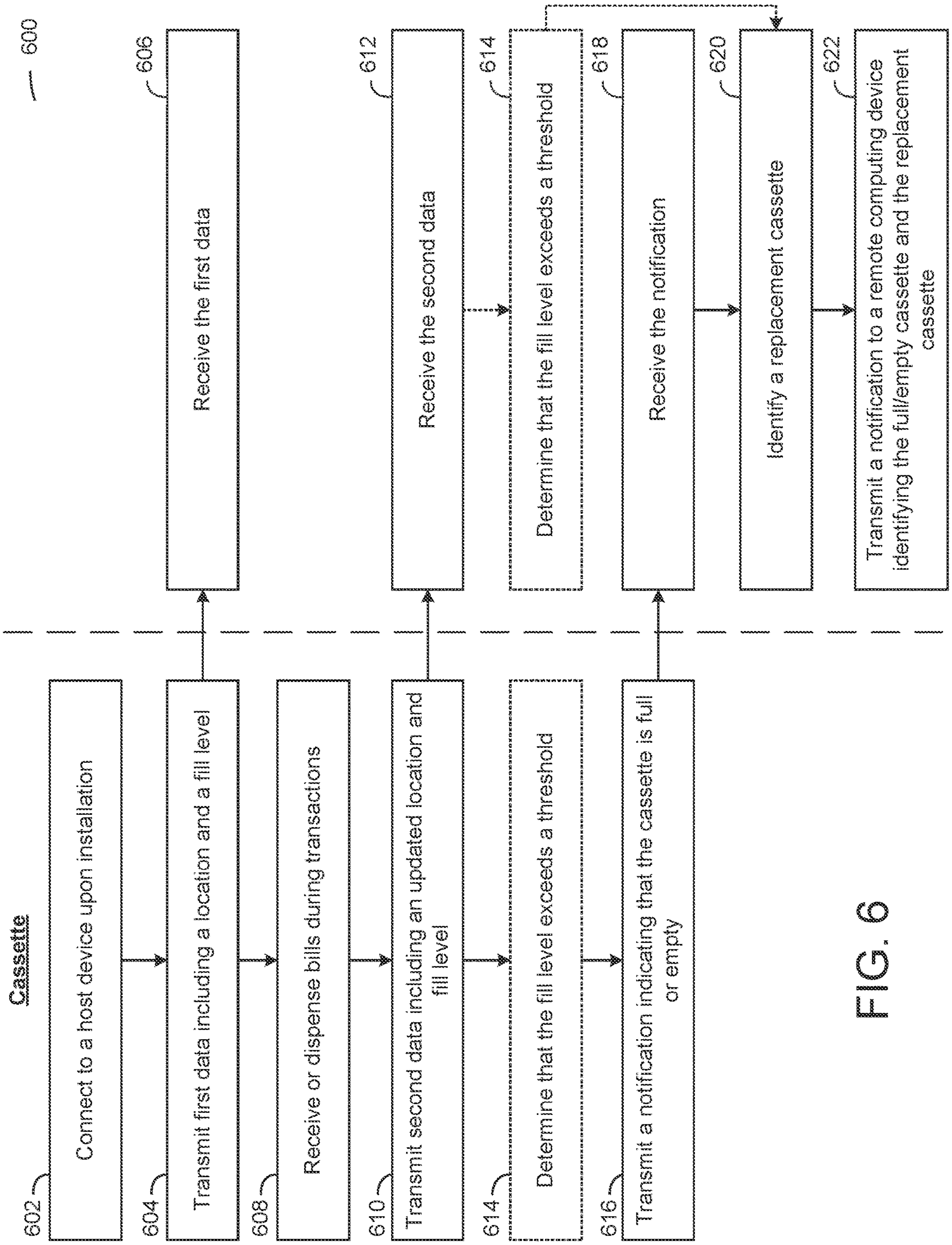
FIG. 6 is a flow diagram illustrating a process for identifying and replacing full or empty cassettes, according to some embodiments.

Referring now to FIG. 6, a flow diagram illustrating a process 600 for identifying and replacing full or empty cassettes is shown, according to some embodiments. In some embodiments, process 600 is implemented by one or more of the components of system 100. Specifically, certain steps of process 600 may be implemented by a universal cassette (e.g., universal cassettes 108) and/or a host device (e.g., host device(s) 332), while other steps may be implemented by a central computing system (e.g., server 102). It will be appreciated that certain steps of process 600 may be optional and, in some embodiments, process 600 may be implemented using less than all of the steps.

Process 600 may, advantageously, allow for the tracking of universal cassettes (e.g., universal cassettes 108) with minimal manual interference. For example, process 600 may automatically or semi-automatically identify universal cassettes that are in need of replacement, identify replacement cassettes based on various parameters, and alert a user (e.g., a bank employee) to initiate a swap of the identified cassettes. In this regard, process 600 may ensure that all of the cassettes utilized by a company (e.g., financial institution) contain an appropriate number of bills, to reduce interruptions or customer dissatisfaction due to empty or full cassettes, which may take time to replace and may prevent certain operations of a host device (e.g., an empty ATM cannot dispense requested funds). Process 600 may also allow a company to accurately track cassette movement and usage for improved auditing, security, and maintenance.

At step 602, a first universal cassette is docked and/or connected to a host device. Docking the first universal cassette to the host device may include, for example, placing the first universal cassette into a secured portion of the host device and/or electronically coupling the two devices. In some embodiments, the first universal cassette may include an external electrical/communications connection that may mate with a corresponding connection on the host device during docking, to couple the two devices. This electrical connect may provide energy to the first universal cassette (e.g., to charge an internal battery or to power a control circuit) and, in some cases, may provide a path for the first universal cassette and the host device to exchange data.

At step 604, the first universal cassette transmits first data including at least a current location and a fill level of the first universal cassette. The first universal cassette may transmit the first data to a central computing system, such as a server, via a wired or wireless connection. For example, the first universal cassette may connect to a WiFi or cellular network to wirelessly transmit the first data. In another example, the first universal cassette may communicate via a wired connection, such as via the host device. In this example, the host device (e.g., a teller station) may be hard-wired to a network and/or the central computing device, such that the host device can relay information from the first universal cassette.

Prior to transmitting the first data, the first universal cassette may determine a current location based on one or more internal sensors/transceivers, or based on location data receive from the host device. In some embodiments, the first universal cassette includes a GPS transceiver used to detect the cassette's current location in real time, or at regular intervals. For example, the first universal cassette may regularly determine a current latitude and longitude, which is include in the first data.

In some embodiments, the first universal cassette includes a cellular transceiver or other similar wireless transceiver for detecting location by triangulation, or based on the location of a nearest beacon or tower. For example, the first universal cassette may triangulate its position based signals received from one or more cellular towers. As another example, the first universal cassette detects its location using a WiFi positioning system (e.g., via a WiFi transceiver). In this example, the first universal cassette may detect the location based on the characteristic of local wireless access points.

In other embodiments, the first universal cassette receives location data from the host device via a wired or wireless connection. For example, the host device may provide the first universal cassette with a latitude and longitude, a street address, a branch name or identifier, or any other information that may identify the first universal cassette's location. In some embodiments, the first universal cassette may simply include an identifier of the host device in the first data, which can be used by a central computing system to determine the first universal cassette's location.

As discussed in detail above, the fill level of the first universal cassette may be determined by one or more internal sensors. For example, the fill level may be determined by detecting a number of bills contained within the first universal cassette, by measuring the physical height/depth/thickness of the stack of bills contained within the first universal cassette, or by a combination of these techniques. In any case, the fill level may indicate how full or empty the first universal cassette is (e.g., as a percentage). In some cases, such as for use in an ATM, the first universal cassette may be filled prior to docking to the host device (e.g., by an external refilling station). In other cases, the first universal cassette may be empty at docking, although the first universal cassette may also be at any fill level in between.

In some embodiments, a portion of step 604 is performed by the host device, rather than the first universal cassette, in response to the first universal cassette being installed. For example, the first universal cassette may lack the long-range wireless communication abilities needed to transmit the first data to the central computing system. Accordingly, the host device may relay the fill level and location data to the central computing system. As another example, the first universal cassette may be able to detect a fill level, but not a location, in which case the host device may determine the location data which is then provided to the first universal cassette or the central computing system.

It will be appreciated that additional information may also be included as part of the first data, in addition to the location and fill level information. For example, the first data may also include an updated transaction or event log, as recorded by the first universal cassette. In some embodiments, the first data may also include a battery charge level for the central computing system.

At step 606, the central computing system receives the first data. As mentioned above, the central computing system may be a server or other similar device hosted (e.g., operated and maintained) by the same institution that operates the host devices and/or universal cassettes, or by a third party (e.g., a cloud service). In any case, the central computing system may be an upper-tier or the highest tier in a computing architecture for the institution, capable of performing various functions and storing a wide variety of data. The central computing system may receive the first data via a wired or wireless connection from one or both of the first universal cassette or the host device.

At step 608, the first universal cassette receives or dispenses bills during transactions. More specifically, during a transaction, a user may deposit or withdraw bills via the host device, with the host device storing or retrieving the bills via one or more universal cassettes (e.g., including the first universal cassette). The host device may conduct numerous transactions over a period of time thereby continuously filling and/or emptying the first universal cassette. With an ATM, for example, the first universal cassette may solely or more regularly dispense bills in response to user's requesting withdrawals, thereby gradually emptying over time. In the case of a teller station, the first universal cassette may more regularly receive bills in response to deposits, thereby gradually filling over time.

At step 610, the first universal cassette transmits second data including an updated location and fill level. In many regards, steps 610 is significantly similar to step 604, described above, however the second data may include updated location data and an updated fill level for the first universal cassette. Accordingly, prior to step 610, the first universal cassette may determine a current location and a current fill level, which are then transmitted to the central computing device. In some embodiments, the second data is transmitted at a regular interval, such as every few seconds, every hour, once per day, etc. In other embodiments, the second data is transmitted after each transaction (e.g., at step 608). In yet other embodiments, the second data is transmitted based on a request from the central computing device.

At step 612, the central computing system receives the second data. In some embodiments, after receiving the first or second data, the central computing system may update one or more databases (e.g., generate a transaction or audit log) to record the received data. In other words, the central computing system may maintain records of the fill levels, locations, battery levels, and other parameters of the first universal cassette for future reference and/or processing. As described above, the central computing system may utilize these records to generate various predictions such as how often the first universal cassette will need to be replaced or refilled.

At step 614, the fill level of the first universal cassette is compared to a threshold value, to determine if the first universal cassette should be replaced. In some embodiments, step 614 is performed by the first universal cassette. In such embodiments, a control circuit of the first universal cassette may store a predefined threshold value defining a minimum fill level or a maximum fill level, and the control circuit may compare a current fill level to the threshold to determine if the cassette is full, near full, near empty, or empty. For example, the threshold for the first universal cassette may be 75% full, such that a fill level over 75% would indicate that the first universal cassette should be replaced.

In other embodiments, step 614 is performed by the central computing system. In such embodiments, the central computing system may compare received fill level data (e.g., as part of the second data) to stored threshold values. In still other embodiments, step 614 is performed by the host device. In embodiments where the central computing system or host device perform step 614, process 600 may continue to step 620, described in detail below. Otherwise, process 600 may continue to step 616.

At step 616, the first universal cassette transmits a first notification indicating that the cassette should be replaced, based on the comparison at step 614. In particular, the first universal cassette may transmit the first notification via the wired or wireless connection described above, to the central computing system, notifying the central computing system that the first universal cassette is full or empty. Subsequently, at step 618, the central computing system receives the first notification, and in some cases updates a database to record the first notification and a time of receipt.

At step 620, the central computing system identifies a second, replacement universal cassette. The second universal cassette may be identified based on a number of parameters, such as location (e.g., proximity to the host device containing the first universal cassette), denomination, fill level, etc. However, in many cases the second universal cassette is identified based at least on the second universal cassette's current location and fill level. For example, based on the second data received at step 612, the central computing device may determine a perimeter or distance from the first universal cassette and/or the host device from which to identify eligible replacement cassettes. The second universal cassette may be located within this perimeter or within a specified distance of the first universal cassette to be identified. Additionally the second universal cassette may be configured to store a similar denomination as the first universal cassette, and/or may have an opposing fill level to the first universal cassette. For example, if the first universal cassette is full, the identified replacement cassette would ideally be empty or nearly empty.

In a more detailed example, a geofence may be established around the first universal cassette and/or the host device that specifies that replacement cassettes should be obtained from less than a certain distance from the first universal cassette. For example, it may be determined that the first universal cassette should be replaced with a cassette from the same location or branch (e.g., a bank branch), or from a similar region (e.g., a group of branches). The central computing system may then determine which eligible cassettes have an appropriate fill level. For example, a cassette in a teller station may be full of a certain denomination of bill, and may therefore be an ideal candidate for replacing an empty cassette of the same denomination at an ATM at the same location (e.g., branch) as the teller station.

At step 622, the central computing system transmits a second notification to a remote device, such as user device 334, providing instructions to replace the first cassette with the second cassette. In various embodiments, the central computing system transmits the second notification as a text message, a push notification, a pop-up, an email, a voice call, or by any other suitable method. For example, the central computing system may cause a user device (e.g., a computer at a teller's station) to display a pop-up window identifying the first and second universal cassettes and/or the host device, a location of the first and/or second universal cassettes, a reason for replacing the first universal cassette (e.g., "The first cassette is full and should be replaced"), and any other desired information. The second notification may prompt the user (e.g., a bank employee) to swap the cassettes, and in some cases may identify subsequent location for the first universal cassette after removal (e.g., "Dock the first cassette in teller station A").

Additionally, the universal cassettes discussed above (e.g., the universal cassettes 108) may include or be embodied as mixed denomination cassettes (e.g., mixed denomination cassettes 108) for managing a plurality of bills, according to various embodiments. In particular, the mixed denomination cassettes described herein may be docked (i.e., installed, disposed within and/or communicatively coupled to) in various host devices or systems, including various models or types of ATMs, teller stations such as teller counters at banks, cash recyclers, POS systems, etc. In other words, these cassettes are "universal" in that they can be configured to function with a variety of systems. A mixed denomination cassette can include a control circuit, which may be an embodiment within the cassette in whole or in part (e.g., as an integrated circuit, a system on a chip (SOC), a removable card, etc.). The control circuit can include one or more sensors for detecting denomination, bill quality, fill level, location, and various other parameters associated with operations of the mixed denomination cassette. The mixed denomination cassette can include a bill storage component and a picker system for storing and retrieving a plurality of bills of various denominations. The picker system is advantageously structured to traverse the bill storage component enabling storage and retrieval of bills of a plurality of denominations in a single storage area within the cassette. The universal cassette can be docked into a host device, such as an ATM, to facilitate the storage and retrieval of bills over a plurality of transactions. The mixed denomination cassette may be communicatively coupled to the host device, and the mixed denomination cassette and/or the host device may be communicatively coupled to a central computing system (e.g., a remote server), such as a financial institution server.

Figure 7:
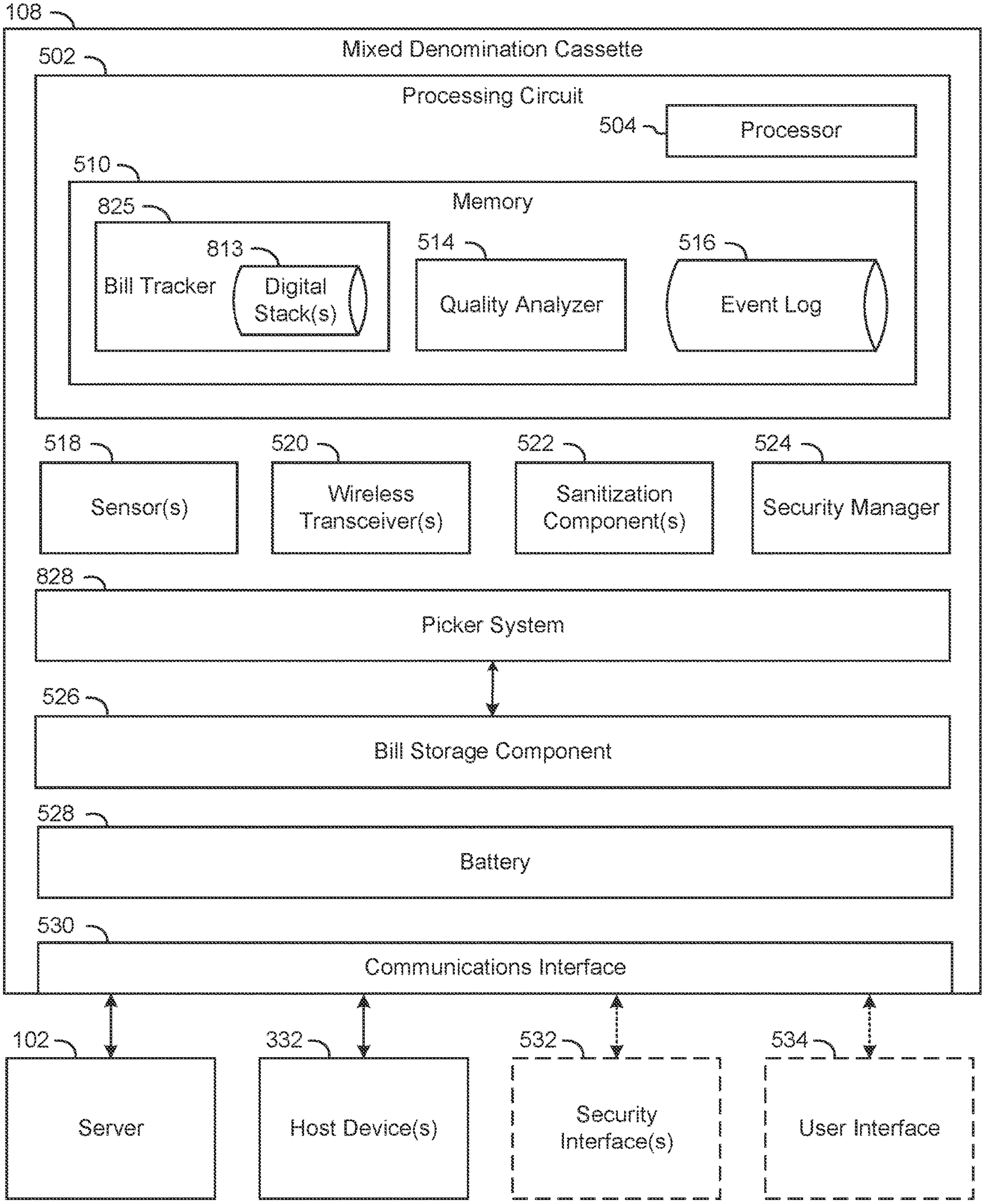
FIG. 7 is a block diagram of a mixed denomination cassette, such as the mixed denomination cassette included in the cassette management system of FIG. 1, according to some embodiments.

As shown in FIG. 7, a mixed denomination cassette 108 is structured for installation or implementation in a host device, and is configured to receive, store, and/or dispense bills. Accordingly, the mixed denomination cassette 108 may include a bill storage component 526 for holding any suitable number of bills. In some embodiments, the mixed denomination cassette 108 may be configured to retrievably store multiple denominations of bills. For example, the mixed denomination cassette 108 may be preconfigured (e.g., preprogrammed) to store multiple denominations, or may be preconfigured to store bills of a particular denomination. For example, the mixed denomination cassette 108 may detect, via one or more sensors, a denomination of a first bill and may record this denomination or cause this denomination to be recorded by the host device. In some embodiments, more than one mixed denomination cassette 108 may be installed in the host device and the particular denomination stored by each of the mixed denomination cassettes 108 may be determined by a position within a host device. For example, a first mixed denomination cassette 108 may be docked in a position associated with a particular denomination within the host device.

Mixed denomination cassettes 108 may advantageously receive, store, and/or dispense bills of a plurality of denominations and are also structured to work with a variety of different host devices. These improved features may allow both teller station(s) 104 and ATM(s) 106 to manage a plurality of bills of various denominations with a single mixed denomination cassette 108, therefore saving space, reducing complexity, and solving the technical problem of cross-device interoperability. In other words, mixed denomination cassettes 108 may enable management of bills of various denominations in a host device(s) that could otherwise require multiple cassettes. For example, a mixed denomination cassette 108 may be structured to be docked in both teller station(s) 104 and ATM(s) 106, with both devices configured to manage a plurality of bills of various denominations with a plurality of mixed denomination cassettes 108. A single mixed denomination cassette 108 may replace a plurality of cassettes in each device and the mixed denomination cassettes 108 may be swapped between the two types of devices. Additionally, the mixed denomination cassettes 108 may include a control circuit to perform a variety of functions not typically handled by a cassette (e.g., for an ATM or cash recycler). For example, the mixed denomination cassettes 108 may be configured to detect a denomination, quality, and/or authenticity of stored bills, and may also track the number (amount), or fill level of stored bills. In this manner, it can be determined whether the mixed denomination cassettes 108 are full, nearly-full, empty, or nearly-empty, and one or more automated actions can be initiated.

In some embodiments, the mixed denomination cassette 108 can be installed in each of the cassette slots 420-424 discussed above with respect to FIG. 4. For example, the cassette slot 420 ("Cassette Slot A") may be associated with $20 bills, $50 bills, and $100 bills and, a first mixed denomination cassette 108 can be docked into the cassette slot 422 and configured to store $20 bills, $50 bills, or $100 bills. The cassette slot 422 ("Cassette Slot B") may be associated with $1 bills, $5 bills, and $10 bills, and a second mixed denomination cassette 108 can be docked into the cassette slot 422 and configured to store $1 bills, $5 bills, or $10 bills.

With continued reference to FIG. 7, the mixed denomination cassette 108 may be similar to the universal cassette 108 discussed above with similar components labeled with similar numbers, and may be configured to determine the denomination of a bill, track a bill identifier of the bill (e.g., a serial number), and determine a current location of the bill. The denomination, bill identifier, and current location can be transmitted to the other components of system 100 for accurate cassette tracking. The mixed denomination cassette 108 can alert server 102 when a bill storage component is full, nearly full, nearly empty, or empty, allowing server 102 to automatically identify a replacement cassette. Similar to the universal cassette 108 discussed above, the mixed denomination cassette 108 may also communicate with additional components such as security interfaces 532 and/or a user interface 534. The mixed denomination cassette 108 may include a security manager 524 which may operate cooperatively with the security interfaces 532 to restrict, track, and/or control access to mixed denomination cassette 108.

As shown, the mixed denomination cassette 108 includes a processing circuit 502 that includes a processor 504 and memory 510 and is communicatively coupled to the mixed denomination cassette 108. The processing circuit 502 may be embodied within the mixed denomination cassette 108 in whole or in part (e.g., as an integrated circuit, a system on a chip (SOC), a removable card, etc.). In some embodiments the processing circuit 502 may be embodied within the central computing system, shown as the server 102. Together with the other components of mixed denomination cassette 108, the processing circuit 502, the processor 504, and the memory 510 form at least a portion of a control circuit for the mixed denomination cassette 108. In various embodiments, the processor 504 is implemented as a general-purpose processor, an application specific integrated circuit (ASIC), one or more field programmable gate arrays (FPGAs), a digital signal processor (DSP), a group of processing components, or other suitable electronic processing components structured to control the operations of the mixed denomination cassette 108.

The memory 510 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. The memory 510 may be or include volatile memory or non-volatile memory. The memory 510 may include database components, object code components, script components, or any other type of information structure for supporting the various activities and information structures described in the present application. According to an exemplary embodiment, the memory 510 is communicatively connected to processor 504 via processing circuit 502 and includes computer code for executing (e.g., by processing circuit 502 and/or processor 504) one or more processes described herein.

The memory 510 is shown to include a bill tracker 825, which may be configured to track a number of bills stored in a bill storage component 526 including a denomination indication and a storage position for each bill, and/or to determine a fill level of the cassette (e.g., the fill level of the bill storage component 526). In particular, the bill tracker 825 receives data from one or more sensors 518 that indicates a fill level of the bill storage component 526, receives data from the one or more sensors 518 that indicates a denomination of a bill, tracks the fill level and/or the number of bills over time, and/or maintains a digital stack or digital bill list comprising bill information including a denomination and a storage position of each of a plurality of bills stored within the bill storage component 526. The one or more sensors 518 may include any of a plurality of sensors for measuring and/or detecting parameters associated with the operations of mixed denomination cassette 108 such as denomination information of an incoming bill, dimensions of the bills stored in the bill storage component 526 (e.g., height of a stack of bills stored in the bill storage component 526), a bill count for the bills stored in the bill storage component 526, a storage position of a bill stored in the bill storage component 526, a condition of an incoming bill, an authenticity of an incoming bill, dimensions of an incoming bill (e.g., thickness), an identification of an incoming bill (e.g., serial number), or a battery level of the mixed denomination cassette 108. In some embodiments, the sensors 518 may include an optical sensor or other sensor that can count each bill as it is deposited into or retrieved from bill storage component 526. For example, as bills pass the sensor, the bill tracker 825 may add or subtract from a count of the total number of bills in bill storage component 526. In some embodiments, the sensors 518 may include a denomination sensor that can provide denomination information indicative of a denomination of a bill.

The bill storage component 526 retrievably stores a plurality of bills. In some embodiments, the bill storage component 526 stores bills linearly in a stack (i.e., stackingtype), radially in a spool (i.e., winding-type), or in other ways. In some embodiments, the bill storage component 526 stores a plurality of bills within a storage space defined between a fixed first end and a second end which is the stored bill which is the farthest from the first. A picker system 828 is coupled to the bill storage component 526 and structured for storing and/or retrieving a plurality of bills from the bill storage component 526. The bill storage component 526 may be structured to provide the picker system 828 access to the plurality of stored bills via an open portion exposing an edge of each of the plurality of stored bills such that any of the plurality of stored bills may be moved out of the open portion by the picker system 828. In some embodiments, the bill storage component 526 may be structured to store a plurality of bills linearly in a stack and may be further structured with an opening to expose a side of each of the plurality of stored bills to provide the picker system 828 access to the plurality of stored bills for storing and/or receiving.

In some embodiments, the sensors 518 include a fill sensor, configured to measure a height of a stack of bills in the bill storage component 526, or to otherwise measure a fill level of the bill storage component 526. In such embodiments, the fill sensor may include one or more switches, an optical sensor, or any other suitable sensor that can determine the fill level or dimensions of the stack of bills in the bill storage component 526. In some embodiments, the bill tracker 825 determines a fill level of the bill storage component 526 based on data from the one or more sensors 518, and can track the fill level over time. In some embodiments, the one or more sensors 518 can include multiple sensors for both counting a number of bills in bill storage component 526 and for determining the fill level of the bill storage component 526.

In some embodiments, it may be advantageous to track both the bill count and the fill level of the mixed denomination cassette 108, because bills often vary in dimensions between locations (e.g., regions, countries, states, climates, etc.), and based on age or quality. For example, well worn, old, or used bills may be significantly thicker or thinner than brand new bills, meaning that fewer bills can fit in the bill storage component 526. Similarly, bills may be slightly thicker in areas with high humidity when compared to bills in areas of low humidity. Accordingly, a count of the bills as they enter/exit the mixed denomination cassette 108 and a fill level of the bill storage component 526 can be used together to determine how many bills will fit in the bill storage component 526 and/or to determine when the bill storage component 526 is nearing full or empty.

In some embodiments, the bill tracker 825 can be structured to include a multi-denomination currency counter circuit that stores each bills denomination, storage location, and a total currency value stored in the bill storage component 526. In some embodiments, the total currency value includes a total count of each type of denomination. For example, the bill tracker 825 may determine that forty-five $20 bills are stored in the bill storage component 526 for a first denomination currency total of $900 in $20 bills. A denomination currency total can be determined and stored for each denomination accepted by the mixed denomination cassette 108. For example, the mixed denomination cassette 108 may store a first denomination currency total for $20 bills, a second denomination currency total for $10 bills, a third denomination currency total for $5 bills, and a fourth denomination currency total for $1 bills.

In some embodiments, the multi-denomination currency counter circuit determines a total currency value including a total of all denominations of bills stored within the bill storage component 825 (e.g., a total currency value within the multi-denomination cassette 108). The total currency value (e.g., denomination specific are all denomination inclusive) can be used internally by the multi-denomination cassette 108, or transmitted from the multi-denomination cassette 108 to other multi-denomination cassettes 108, other universal cassettes 108, the host device 332, the server 102, teller stations 104, and/or ATMs 106 directly through a wired connection, directly through a wireless connection, and/or via the network 110 (e.g., through a wired connection or a wireless connection). In some embodiments, the multi-denomination currency counter resides in the memory 510 of the multi-denomination cassette 108. In some embodiments, the multi-denomination currency counter resides in the memory 510 of the universal cassette 108, the memory 410 of the host device 332, and/or the memory 310 of the server 102. Information generated by the multi-denomination currency counter can be used by any of the system disclosed herein to monitor or utilize a running currency total (e.g., a running dollar total) of the multi-denomination cassette 108 in real times.

In some embodiments, the bill tracker 825 may constantly or at least regularly adjust a threshold (i.e., limit) indicating that the bill storage component 526 is full, nearly full, nearly empty, or empty, based on data from one or more of the sensors 518. For example, the bill tracker 825 may compare bill counts and fill levels at regular time intervals (e.g., every few minutes, once per day, etc.) to learn the quality and size of the bills in a current location. This knowledge of bill thickness, counts, fill levels, etc., can be used to adjust the threshold for the mixed denomination cassette 108 in real-time or near real time, making the mixed denomination cassette 108 much more flexible than other cassettes by more accurately tracking fill levels.

In some embodiments, the one or more sensors 518 may include a denomination sensor, configured to provide denomination information indicative of a denomination of a bill. In such embodiments, the denomination sensor may include an optical character recognition sensor, one or more switches, an optical sensor, or any other suitable sensor that can be used to provide the denomination information of a bill. In some such embodiments, the denomination sensor may be structured such that it provides denomination information for a bill as the bill is deposited into or retrieved from the bill storage component 526. For example, a denomination sensor may be positioned to scan incoming or outgoing bills as they pass into and/or out of the mixed denomination cassette 108, providing denomination information for bills entering or leaving the cassette. The bill tracker 825 may determine a denomination of each of a plurality of bills stored within the bill storage component 526 based on the denomination information provided by the one or more sensors 518.

The bill tracker 825 is also shown to include (e.g., retrievably store) one or more digital stack(s) 813 (i.e., digital bill lists) for recording bill information for the bills stored within the bill storage component 526. Specifically, the bill tracker 825 may generate a primary digital stack 813 comprising bill information including a denomination and a storage position of each of a plurality of bills stored within the bill storage component 526. In some embodiments, the primary digital stack 813 may be configured such that the bill list starts with a bill stored at a first end of bill storage component 526 and ends with a bill stored at a second end of the bill storage component 526. Bill information may be stored in a table including rows for each stored bill and columns for storage position and denomination information. The bill tracker 825 may constantly or at least regularly generate an updated primary digital stack 813 for the bill storage component 526. For example, the bill tracker 825 may generate an updated primary digital stack for the bill storage component 526 at regular time intervals (e.g., every second, every minute, etc.). In another example, the bill tracker 825 may generate an updated primary digital stack for the bill storage component 526 after each deposit or retrieval of one or more bills.

In some embodiments, the bill tracker 825 may store one or more secondary digital stacks 813 for tracking bills routed to other portions of the mixed denomination cassette 108 (e.g., for bills routed to a first staging area 804) or to other locations of the host device 332 (e.g., for bills routed to another cassette) for temporary storage. In such embodiments, the bill tracker 825 may store the one or more secondary digital stacks 813 for tracking bills routed to at least one of a first staging area 804 and a second staging area for temporary storage. For example, the bill tracker 825 may store a secondary digital stack 813 comprising bill information for three bills routed to a first staging area 804 of the picker system 828 during a validation of a retrieved bill, described in detail below with respect to FIG. 8.

In some embodiments, a storage position of a bill may be identified as a position of the bill relative to other bills within the bill storage component 526 of a mixed denomination cassette 108. In other words, the position of the bill within the bill storage component is defined by the bills on either side of the bill (e.g., above or below). In some embodiments, a storage position of a bill may be determined as a number corresponding to the number of bills stored up to and including the bill from a first end. For example, the bill storage component 526 may contain the following bills stored in the following order $5-$10-$20-$50. As such, the bill tracker 825 may generate a primary digital stack 813 including storage positions of 1 for the $5, 2 for the $10, 3 for the $20, and 4 for the $50. In another example, the bill storage component 526 may contain the following bills stored in the following order $5-$10-$20-$50 and a $1 may be deposited and stored between the $10 and $20. As such, the bill tracker 825 may generate a primary digital stack 813 including storage positions of 1 for the $5, 2 for the $10, 3 for the $1, 4 for the $20, and 5 for the $50.

The bill tracker 825 may determine a storage position of a stored bill based on information received from the sensors 518. In some embodiments, the bill tracker 825 may determine a storage position of a bill as a physical distance from a reference point (e.g., linear distance from a first end, radial distance from an origin, etc.) within the bill storage component 526. In some embodiments, the bill tracker 825 calculates and/or determines a storage position of a stored bill. For example, the bill tracker 825 may calculate an approximate thickness of each stored bill using fill level information and bill count, and apply the approximate thickness to the position in which the bill is stored relative to other bills (i.e., relative position) to determine a physical distance. In another example, the bill tracker 825 may determine an approximate thickness of each stored bill within the bill storage component 526 as 0.10 millimeters and may subsequently determine a storage position of a first bill (i.e., a bill stored at a first end of bill storage component 526') as 0.10 millimeters. In another example, the bill tracker 825 may determine a storage location of a bill as 5.5 millimeters from a first end of the bill storage component 526 based on a relative position of the bill (e.g., the bill is the fiftieth bill stored) and an approximate thickness of each stored bill of 0.11 millimeters. In this manner, the bill tracker 825 may simultaneously determine a storage position for each of a plurality of bills stored within the bill storage component 526. For example, the bill tracker 825 determines an approximate thickness of each stored bill within bill storage component 526 as 0.11 millimeters and subsequently determines a storage position for each of three bills such that a storage position of a first bill is 0.11 millimeters, a storage position of a second bill is 0.22 millimeters, and a storage position of a third bill is 0.33 millimeters.

In some embodiments, the bill tracker 825 may receive one or more transaction requests from a host device 332 indicating a bill of a specific denomination for dispensing. For example, the bill tracker 825 may receive three transaction requests from the host device 332 during a transaction where a user requests withdrawal of a $50 bill and two $20 bills. The bill tracker 825 may receive one transaction request indicating one $50 bill for dispensing and another two transaction requests indicating $20 bills for dispensing. In such embodiments, the bill tracker 825 may identify a target bill from a primary digital stack 813 as one of the plurality of stored bills matching the specific denomination of a received transaction request and may subsequently cause the picker system 828 to retrieve and dispense the target bill.

The bill tracker 825 may also be configured to identify a storage position within the bill storage component 526 to store a deposited bill and may be further configured to cause the picker system 828 to store the deposited bill within the bill storage component 526 at the identified storage position. In some embodiments, the bill tracker 825 may identify a storage position for a deposited bill based on a determined denomination for the deposited bill. In some embodiments, the bill tracker 825 may be configured to identify a storage position that is located adjacent to one or more bills of the same denomination as the deposited bill. For example, the bill tracker 825 may identify a storage position for a deposited $20 bill that is located adjacent to a position containing a $20 bill. In this manner, the bill tracker 825 may store bills of a particular denomination in groups within bill storage component 526.

In other embodiments, the bill tracker 825 may be configured to identify a storage position for a deposited bill from a plurality of predefined storage positions. Each of the plurality of predefined storage positions may be associated with a particular denomination or associated with two or more mixed denominations. A predefined storage position may be any position within a portion of the bill storage component 526 and the portion may be defined by relative boundaries. Each predefined storage position may include a limit on the amount of bills that may be stored within. For example, a predefined storage position associated with $10 bills may be any position within a first portion of the bill storage component 526 starting at a first end and may contain up to fifty $10 bills. Accordingly, a predefined storage position associated with $20 bills may be any position within a second portion of the bill storage component 526 starting after the first portion and extending to a third portion which is associated with mixed denominations of $1, $5, $10, $50, and $100 bills. In this case, up to fifty $10 bills can be stored in a group starting from a first end of the bill storage component 526, additional $10 bills may be stored in a third portion along with $1, $5, $50, and $100 bills, and $20 bills may be stored in a second portion. It will be appreciated that these example predefined storage positions are not intended to be limiting, and that predefined storage positions may be configured in other ways.

In some embodiments, the bill tracker 825 may operate cooperatively with a quality analyzer 514, which may also utilize data from the one or more sensors 518 to determine various bill quality parameters. In this case, the sensors 518 may include sensors that measure an age or a condition of the incoming bills, and may also include sensors that determine the authenticity of the bills. For example, optical sensors or other appropriate sensors can scan passing bills (e.g., entering bill storage component 526') to detect counterfeit bills and/or to detect non-recyclable bills (i.e., bills that are too old or worn for recirculation). The quality analyzer 514 may also determine, based on the sensor data, dimensions of the bills (e.g., thickness), which may be used to determine the number of bills that can be stored in the bill storage component 526 before reaching the threshold.

In some embodiments, the quality analyzer 514 may detect non-recyclable (e.g., counterfeit, worn, etc.) bills, and may transmit an alert to the host device 332 and/or the server 102. In such embodiments, the host device 332 may alter a transportation path of the non-recyclable bills, such as by routing the bills to a cassette specifically allocated for holding non-recyclable bills. In some embodiments, such as when counterfeit bills are detected, the quality analyzer 514 may alert the server 102, which may cause the server 102 to save transaction details for additional investigation.

Figure 8:
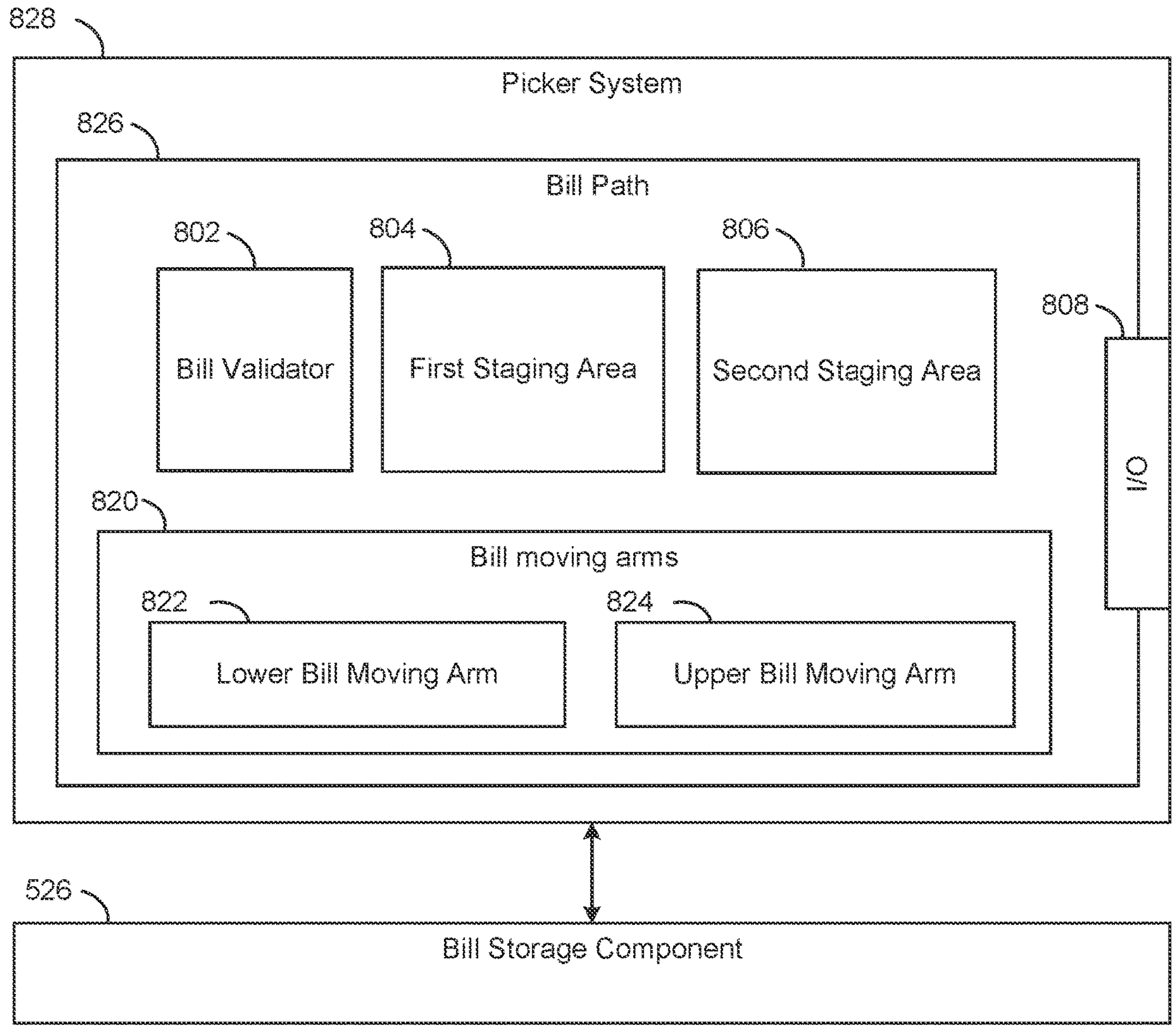
FIG. 8 is a block diagram of a picker system, according to some embodiments.

As shown in FIG. 8, the picker system 828 is coupled to the bill storage component 526 and is configured for storing and/or retrieving a plurality of bills in/from bill storage component 526. The components of the picker system 828 are coupled to a bill path 826 which may include a series of gears, rollers, belts, motors, tracks, etc., for transporting bills between the components. The picker system 828 is communicatively coupled to a processing circuit 502 which may be configured to cause the picker system 828 to perform various functions such as storing and/or retrieving one or more bills. In some embodiments, the picker system 828 and the bill storage component 526 may be embodied within an enclosure structured to restrict access to the plurality of stored bills within the bill storage component 526. In such embodiments, the enclosure may include any of a number of security interfaces 532 (see FIG. 7) described above and may operate cooperatively with a security manager 524, to restrict, track, and/or control access to the bill storage component 526.

The picker system 828 may be configured to traverse the bill storage component 526 to store and/or retrieve bills in/from any storage position within the bill storage component 526. The picker system 828 may traverse the storage component 526 using a series of tracks, guides, belts, motors, actuators, etc., to move to any storage position within the storage component 526. In some embodiments, the picker system 828 may engage a bill using a series of gears, rollers, belts, motors, tracks, etc. to move the bill into or out of the bill storage component 526. In such embodiments, the picker system 828 may store or retrieve the bill in/from a storage position associated with the bill within the bill storage component 526. In this case, the picker system 828 may traverse the bill storage component 526 to the storage position associated with the bill and engage the bill for storing or retrieving. For example, the bill storage component 526 may contain one hundred $1 bills and one $5 bill and the processing circuit 502 may cause the picker system 828 to traverse the bill storage component 526 to the storage position associated with the $5 bill and engage the $5 bill for dispensing. In another example, the mixed denomination cassette 108 may receive a deposited $20 bill and the processing circuit 502 may cause the picker system 828 to traverse the bill storage component 526 to a storage position adjacent to a stored $20 bill and store the deposited $20 bill. The components of the picker system 828 are described in greater detail below with respect to FIG. 8.

The picker system 828 includes a bill validator 802 structured to provide bill information for bills stored and/or retrieved in/from the bill storage component 526 to the bill tracker 825. The bill validator 802 includes one or more of the sensors 518 and is structured to provide at least denomination information indicative of a denomination of a bill to the bill tracker 825. In some embodiments, the bill validator 802 may include one or more additional sensors 518 which may be structured to provide various other parameters associated with the operations of mixed denomination cassette 108 such as a bill count for the bills stored in the bill storage component 526, a condition of an incoming bill, an authenticity of an incoming bill, dimensions of an incoming bill (e.g., thickness), or an identification of an incoming bill (e.g., serial number). The bill validator 802 is positioned over the bill path 826 and structured such that bills entering or leaving the bill storage component 526 pass under the one or more sensors 518. In this regard, the bill validator 802 provides bill information for bills passing under the bill validator (e.g., bills entering or leaving bill storage component 526') to the bill tracker 825.

In some embodiments, the picker system 828 includes at least one of a first staging area 804 and a second staging area 806, each structured to temporarily store a plurality of bills during various operations of the mixed denomination cassette 108 such as during a validation of a retrieved bill or during a retrieval of two or more bills from nearby storage positions. The operations of the first staging area 804 and the second staging area 806 are described in greater detail below.

The picker system 828 is shown to include an I/O port 808. The I/O port 808 may be a bidirectional port and may be configured to be coupled to host device 332 when the mixed denomination cassette 108 is docked in one of cassette slots 420-424. The I/O port 808 may be structured to facilitate the routing of bills between the picker system 828 and the host device 332. In some embodiments, the I/O port 808 may be flexibly coupled to the picker system 828 in order to allow movement of the picker system 828 for traversing bill storage component 526. For example, the picker system 828 may traverse the bill storage component 526 to a storage position containing a $5 bill, retrieve the $5 bill, and route the $5 bill via the I/O port 808 to the host device 332 for dispensing to a customer. In another example, the picker system 828 may receive, via the I/O port 808 from the host device 332, a $10 bill deposited by a customer. In this case the picker system 828 may traverse the bill storage component 526 to a storage position adjacent to a stored $10 bill and deposit the received $10 bill.

In other embodiments, the I/O port 808 may be removably coupled to the picker system 828. In such embodiments, the picker system 828 may be coupled to the I/O port 808 while the picker system 828 is in a coupled position and uncoupled while the picker system 828 is in any position that is not the coupled position. In this case, a coupled position may be a single position such that the bill path 826 of the picker system 828 aligns with the I/O port 808 to facilitate the routing of bills between the picker system 828 and the I/O port 808. The picker system 828 may couple to the I/O port 808 by traversing to the coupled position and de-couple from I/O port 808 by traversing to any position that is not the coupled position. For example, the picker system 828 may traverse the bill storage component 526 to a storage position containing a $20 bill, retrieve the $20 bill, traverse the bill storage component 526 to a coupled position, and route the $20 bill via the I/O port 808 to the host device 332 for dispensing to a customer.

In some embodiments, the picker system 828 includes a set of bill moving arms 820 including a lower bill moving arm 822 and an upper bill moving arm 824. In such embodiments, the bill moving arms 820 are structured to engage a plurality of bills using a series of gears, rollers, belts, motors, tracks, etc. to move the plurality of bills into or out of the bill storage component 526. The bill moving arms are further structured to engage a subsequent bill from either direction in the bill storage component 526. The lower bill moving arm 822 is structured to engage a subsequent bill from the bill storage component 526 that is closer to a first end (i.e., retrieves bills in a direction towards a first end) and the upper bill moving arm 824 is structured to engage a subsequent bill from the bill storage component 526 that is closer to a second end (i.e., retrieves bills in a direction towards a second end). For example, bill storage component 526 may contain the following bills stored in the following order $5-$5-$5-$50-$10-$20-$20. In this case, picker system 828 can traverse to the storage position of the $50 bill and upper bill moving arm may remove the $50, $10, and $20 bills while picker system 828 remains in the same position. In this same case, picker system 828 can also traverse to the storage position of the $50 bill and lower bill moving arm may remove the three $5 bills while picker system 828 remains in the same position.

In some embodiments, the bill tracker 825 may be configured to cause the picker system 828 to validate a retrieved target bill. Since bills often vary in dimensions, it may be advantageous to validate a retrieved target bill prior to routing the retrieved bill to the host device 332 to ensure that the picker system 828 traversed to the correct storage position and retrieved the correct target bill (e.g., varying bill dimensions may cause the picker system to inaccurately traverse the bill storage component). To validate the retrieved target bill, the bill tracker 825 may compare an identified denomination of the retrieved target bill to a specific denomination of the associated transaction request and the bill tracker 825 may determine a validation is complete based on a matching denomination. In this case, the bill tracker 825 may determine a non-matching bill is not a target bill and may cause the picker system 828 to temporarily store the non-matching bill in a first staging area 804. The bill tracker 825 may subsequently cause the picker system 828 to retrieve one or more additional target bills from the bill storage component 526 for comparison until a matching bill is retrieved. Validation may include a preconfigured limit on the number of additional target bills that may be retrieved and the bill tracker 825 may cause the picker system 828 to retrieve, compare, and temporarily store additional bills until a bill having a matching denomination is retrieved or the limit of additional target bills is reached. In this regard, validation of a retrieved target bill may be considered as a correction to an inaccurate traverse of the bill storage component 526 by the picker system 828 to the storage position of the target bill. In some embodiments, the bill tracker 825 may generate a secondary digital stack to track a plurality of non-matching bills temporarily stored in the first staging area 804 during a validation. After a validation of a retrieved target bill is complete, the bill tracker 825 may cause the picker system 828 to route the plurality of non-matching bills temporarily stored in the first staging area 804 to the bill storage component 526.

In other embodiments, the picker system 828 may be structured to validate an identified storage position for a bill prior to storing the bill in the bill storage component 526. Since bills often vary in dimensions, it may be advantageous to validate a storage position prior to storing bills to ensure the picker system traversed to the correct storage position (e.g., varying bill dimensions may cause the picker system to inaccurately traverse the bill storage component to an incorrect storage position). In some such embodiments, the bill tracker 825 may be configured to cause the picker system 828 to retrieve one or more bills from the bill storage component 526 at the identified storage position and the bill tracker 825 may validate the identified storage position in a similar manner as described above by comparing the denomination of the one or more retrieved bills to the denominations of one or more bills located adjacent to the identified storage position within the primary digital stack 813. In this regard, validation of an identified storage position may be considered as a correction to an inaccurate traverse of the bill storage component 526 by the picker system 828 to the identified storage position. After validation, the picker system 828 may store the bill in the identified storage position. After storage of the bill in the identified storage position, the one or more non-matching bills temporarily stored in the first staging area 804 may be stored in the bill storage component 526 in the positions they were retrieved from.

In some embodiments, the bill tracker 825 may determine an actual position of the picker system 828 based on a storage position of a non-matching bill retrieved during a validation. In this case the bill tracker 825 may query the primary digital stack 813 to locate bills matching the denomination of the retrieved, non-matching bill. The bill tracker 825 may identify, from the bills matching the denomination of the non-matching bill, a bill located closest to the target bill/or one or more adjacent bills, as the non-matching bill. Accordingly, the bill tracker 825 may determine an actual position of the picker system 828 as the storage position corresponding to the identified non-matching bill. The bill tracker 825 may determine a direction in which a target bill/or storage position is positioned from the determined actual position and may cause one of bill moving arms 820, corresponding to the direction, to engage a subsequent bill (i.e., determines direction of target bill/or storage position relative to actual position and engages a subsequent bill in said direction).

In some embodiments, the picker system 828 may be structured to store and/or retrieve a plurality of bills in/from a plurality of storage positions within the storage component 526. In this case, the picker system 828 may include a second staging area 806 for temporarily storing a plurality of bills during storing and/or retrieving. In this case, the bill tracker 825 may store a secondary digital stack 813 for tracking the original storage positions of the plurality of temporarily stored bills. For example, a plurality of bills deposited into the mixed denomination cassette 108 may be stored in the second staging area 806. In this case, the bill tracker 825 may identify a storage position for each of the plurality of deposited bills and may cause the picker system 828 to store each of the plurality of deposited bills in each identified storage positon. As mentioned above, the bill tracker 825 may cause the picker system 828 to retrieve one or more bills to validate each identified storage position and the picker system 828 may temporarily store one or more retrieved bills determined not matching in the first staging area 804. The bill tracker 825 may store a secondary digital stack 813 comprising bill information for the one or more retrieved bills including an original storage position within bill storage component 526. After completing validation and storage of one or more of the plurality of deposited bills, the bill tracker 825 may cause the picker system 828 to store one or more retrieved bills in the bill storage component 526 in one or more original storage positions based on bill information stored in the secondary digital stack 813. In this manner the bill tracker 825 may cooperate with the picker system 828 to accurately store a plurality of deposited bills.

Figure 9:
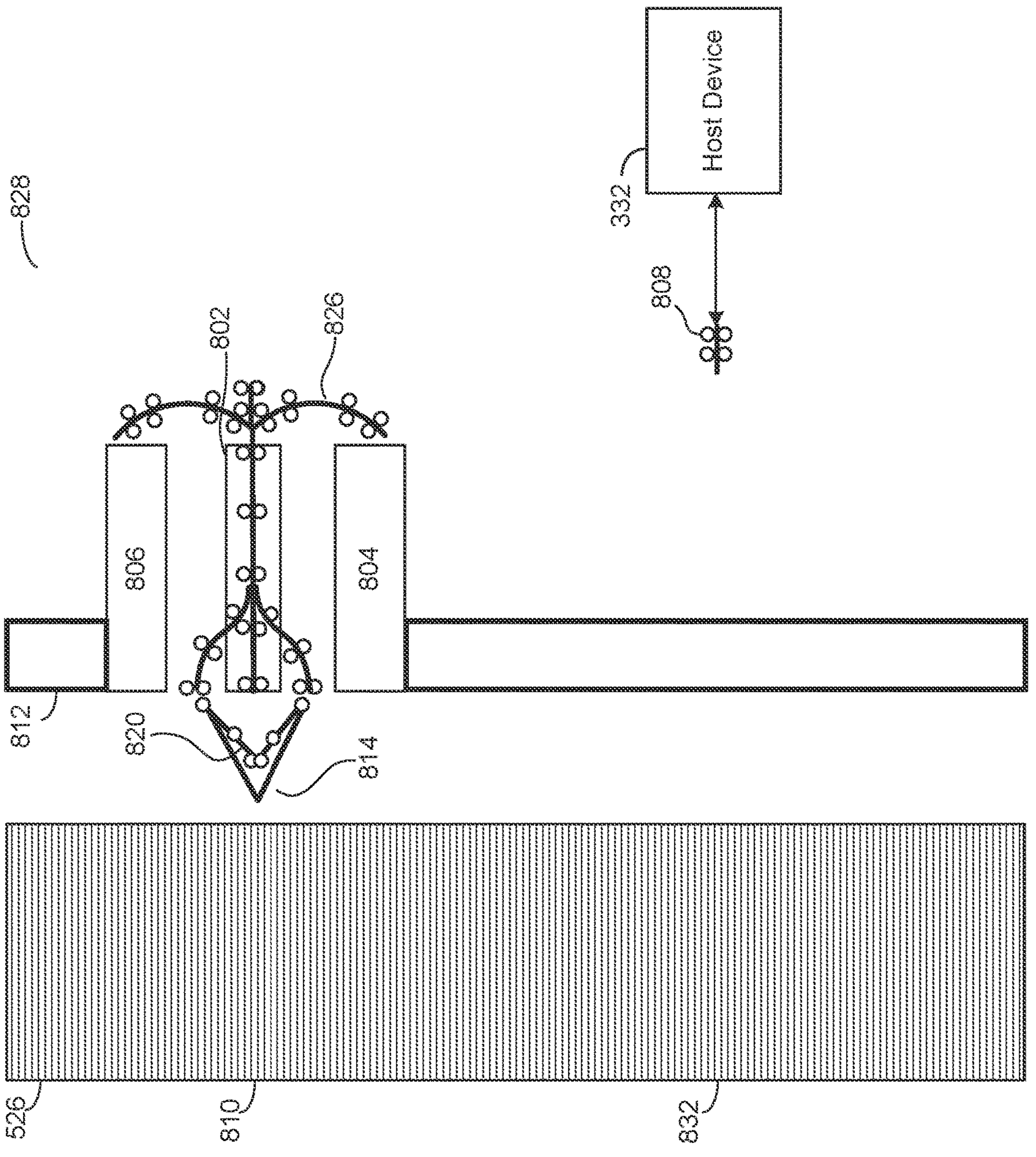
FIG. 9 is a schematic representation of the picker system of FIG. 8.
Figure 10:
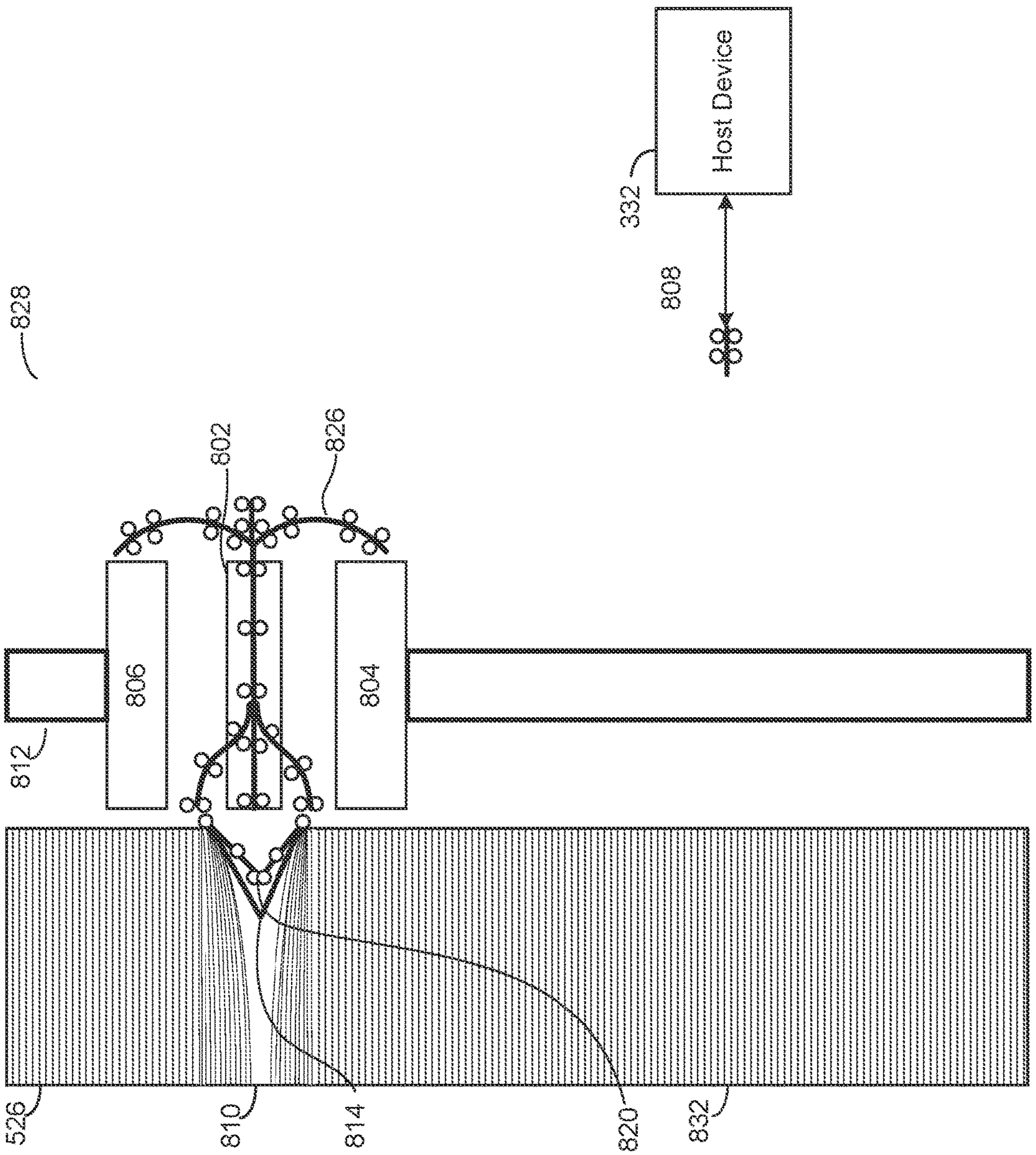
FIG. 10 is another schematic representation of the picker system of FIG. 8.
Figure 11:
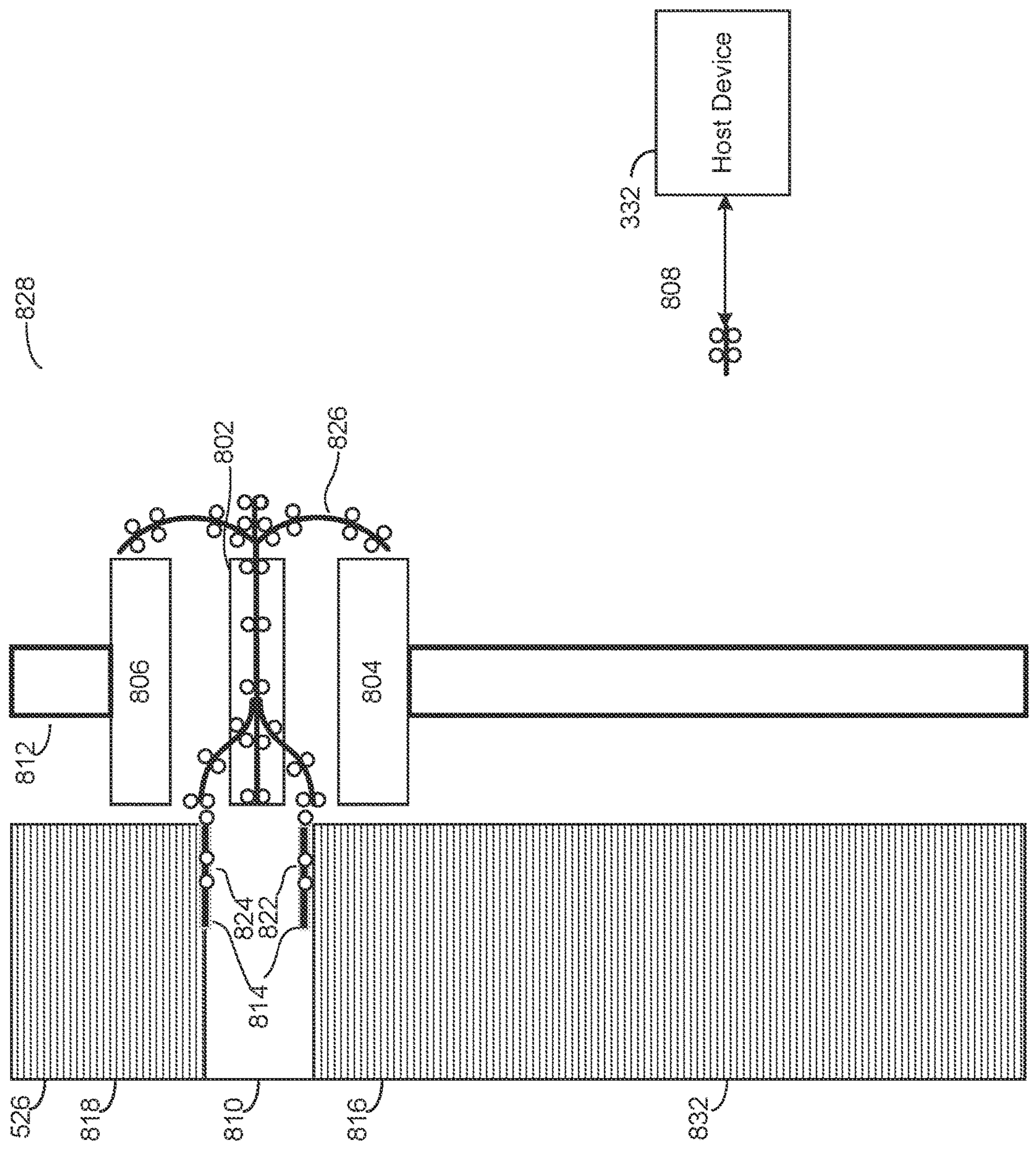
FIG. 11 is another schematic representation of the picker system of FIG. 8.

Referring now to FIGS. 9, 10, and 11, schematic illustrations illustrating the operation of the picker system 828 are shown, according to some embodiments. More specifically, FIGS. 9, 10, and 11 illustrate the movements of components of the picker system 828 during a storage or retrieval of one or more bills. The bill storage component 526 is shown as a plurality of bills stored in a plurality of storage positions (i.e., storage positions shown as horizontal lines representing spaces between stored bills) within a linear stack. The picker system 828 is shown as an assembly of components coupled by the bill path 826 structured to route bills between the components including a splitting end 814, bill moving arms 820, a first staging area 804, a second staging area 806, a bill validator 802, and an I/O port 808. The picker system 828 may utilize one or more motors controlled by processing circuit 502 to move vertically along a linear guide 812 to any storage position within the bill storage component 526 (i.e., to traverse bill storage component 526'). The I/O port 808 is shown to be coupled to host device 332 and may be removably coupled to the bill path 826 when the picker system 828 is in a coupled position 832 as shown. Turning first to FIG. 9, a picker system 828 is shown in a first position corresponding to a storage position 810 within the bill storage component 526. For example, bill tracker 825 may have identified a target bill from the primary digital stack 813 located in storage position 810 in response to a transaction request from the host device 332. The bill tracker 825 may have subsequently caused the picker system 828 to traverse the bill storage component 526 to the storage position 810 to retrieve the identified target bill as shown in FIG. 9.

As shown in FIG. 10, a picker system 828 is in a second position that is closer to the bill storage component 526 than the first position such that the splitting end 814 is in the storage position 810. In some embodiments, the picker system 828 may be structured to move horizontally towards the bill storage component 526 utilizing one or more motors controlled by the processing circuit 502 to drive the splitting end 814 into the storage position 810 as shown. In some such embodiments, the splitting end 814 may be structured as two separate arms connected to the picker system 828 via hinged connections. In this case, the picker system 828 may utilize one or more motors controlled by the processing circuit 502 to rotate the two arms of the splitting end 814 from a closed position, as shown in FIG. 10, to an open position, as shown in FIG. 11. In this manner the picker system 828 may split the bills stored within the bill storage component 526 into an upper portion and a lower portion, described in greater detail below with respect to FIG. 11.

As shown in FIG. 11, the picker system 828 is in a third position shown separating the stored bills within the bill storage component 526 into an upper portion 818 and a lower portion 816 at storage position 810. The picker system 828 may separate the stored bills utilizing one or more motors controlled by the processing circuit 502 to rotate both arms of the splitting end 814 to an open position as shown in FIG. 11. The picker system 828 may engage each separate portion by utilizing one or more motors controlled by the processing circuit 502 to rotate both the upper bill moving arm 824 and the lower bill moving arm 822 to engagement positions as shown in FIG. 11. In some embodiments, the lower portion 816 may be the portion of bills (i.e., portion of bills stored within bill storage component 526) starting at the first end (i.e., of bill storage component 526) and the upper portion 818 may be the portion of bills ending at the second end. As discussed briefly above, the lower bill moving arm 822 may use a series of gears, rollers, belts, motors, tracks, etc. to retrieve one or more bills out of (i.e., engage) the lower portion 816 when in an engagement position as shown in FIG. 11. Similarly, the upper bill moving arm 824 may retrieve one or more bills out of the upper portion 818. The retrieved bills may be routed via the bill path 826 from either of the bill moving arms through the bill validator 802 to provide denomination and/or quality information of the retrieved bills to the bill tracker 825 for validation purposes. In various embodiments, the bill tracker 825 may cause the picker system 828 to route the retrieved bills from the bill validator 802 to either the first staging area 804, the second staging area 806, or to the I/O port 808.

In some embodiments, the bill validator 802 may be structured to route bills into the bill storage component 526. In some such embodiments, bills temporarily stored during validation or deposited bills received from the host device 332 may be routed via the bill validator 802 into the bill storage component 526 between the lower portion 816 and the upper portion 818 of the stored bills. In other words the bill validator 802 may store bills within the bill storage component 526 by placing them between the lower portion 816 and the upper portion 818 of the bill storage component 526. Examples of the picker system 828 operations are described in greater detail below with respect to FIGS. 9-11.

In an example, a mixed denomination cassette 108 receives a transaction request from a host device 332 indicating a specific denomination for dispensing. A bill tracker 825 identifies a target bill located in a storage position 810 as shown in FIG. 9 from a primary digital stack 813 and causes a picker system 828 to traverse a bill storage component 526 to a storage position 810 to retrieve a first bill from a lower portion 816 utilizing a lower bill moving arm 822 as shown in FIGS. 9-11. As the first retrieved bill passes under the bill validator 802, the bill tracker 825 determines that the denomination of the first retrieved bill does not match the specific denomination of the transaction request and the bill tracker 825 causes the picker system 828 to route the first retrieved bill to a first staging area 804 for temporary storage. Based on a determination of the actual position of the picker system 828, the bill tracker 825 further causes the picker system 828 to retrieve a second bill from the upper portion 818 at storage position 810 utilizing an upper bill moving arm 824. As the second retrieved bill passes under the bill validator 802, bill tracker 825 determines that the denomination of the second retrieved bill matches a specific denomination of the transaction request and the bill tracker 825 causes the picker system 828 to route the second retrieved bill to a second staging area 806. The bill tracker 825 subsequently causes the routing of the first retrieved bill from first staging area 804 to the bill storage component 526 between the lower portions 816 and the upper portions 818. Additionally, the bill tracker 825 causes the picker system 828 to traverse to a coupled position 832 to route the second retrieved bill from the second staging area 806 to an I/O port 808 and finally to the host device 332.

Figure 12:
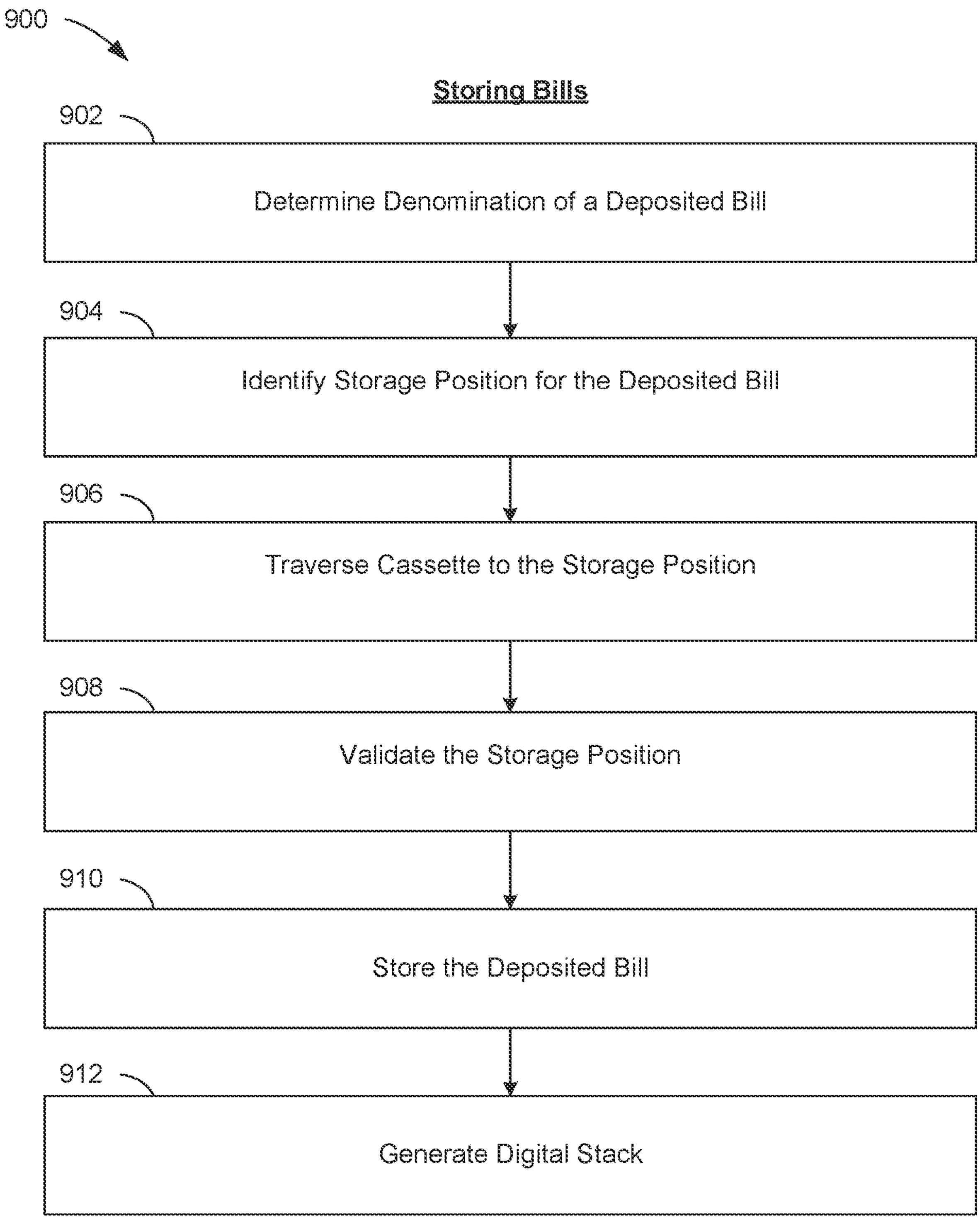
FIG. 12 is a flow diagram illustrating a process for storing bills, according to some embodiments.
Figure 13:
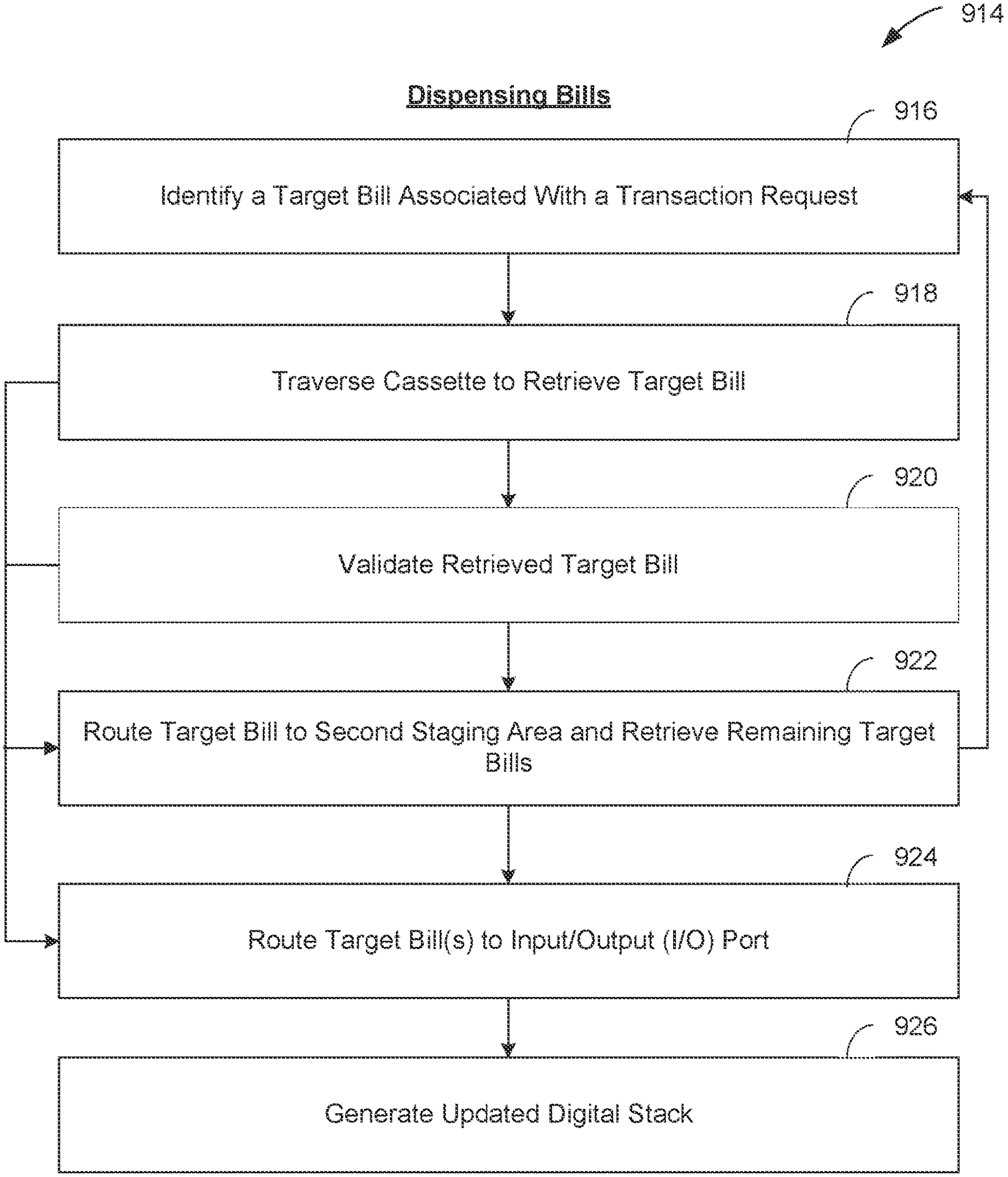
FIG. 13 is a flow diagram illustrating a process for dispensing bills, according to some embodiments.

Referring now to FIGS. 12 and 13, flow diagrams illustrating a process 900 for storing bills and a process 914 for dispensing bills are shown, according to some embodiments.

In some embodiments, process 900 and process 914 are implemented by one or more of the components of system 100. Specifically, certain steps of process 900 and process 914 may be implemented by a mixed denomination cassette (e.g., mixed denomination cassettes 108') and/or a host device (e.g., host device(s) 332), while other steps may be implemented by a central computing system (e.g., server 102). It will be appreciated that certain steps of process 900 and process 914 may be optional and, in some embodiments, process 900 and process 914 may be implemented using less than all of the steps.

Referring now to FIG. 12, process 900 may, advantageously, allow for the storing of a plurality of bills of a plurality of denominations within a single mixed denomination cassette 108. For example, process 900 may automatically store a plurality of bills of a plurality of denominations in the bill storage component 526 and generate a digital bill list (e.g., primary digital stack 813) including the denomination and storage position for each of the plurality of stored bills. In this regard, process 900 may retrievably store the plurality of bills by utilizing the digital bill list (e.g., primary digital stack 813) to identify and retrieve one or more bills of a certain denomination out of the plurality of stored bills. Process 900 may also be configured to store the plurality of bills in certain ways, such as in groups associated with each denomination.

At step 902, a denomination of a deposited bill is determined. The mixed denomination cassette 108 may receive one or more deposited bills from a host device 332 (e.g., an ATM or a teller station). More specifically, during a transaction, a user may deposit one or more bills via the host device 332, with the host device 332 storing the one or more bills via the mixed denomination cassette 108. As discussed in detail above, a denomination of a deposited bill may be determined based on information provided by one or more sensors 518 that may be within the mixed denomination cassette 108 or elsewhere such as within the host device 332. For example, the denomination for the deposited bill may be determined by detecting a denomination marking indicating a specific denomination on a face of the deposited bill. In some embodiments, a portion of step 902 may be performed by the host device 332 or at a central computing system (e.g., server 102), rather than by the mixed denomination cassette 108. For example, a host device 332 may determine a denomination of a deposited bill based on information provided by one or more sensors 518 within the mixed denomination cassette 108. In another example, server 102 may determine a denomination of a deposited bill based on information provided by one or more sensors 518 within the host device.

In some embodiments, a mixed denomination cassette 108 may be structured to receive deposited bills (e.g., from a host device) one at a time. In this case, step 902 may consist of determining the denomination of one deposited bill and process 900 may consist of storing one deposited bill. In other embodiments, a mixed denomination cassette 108 may be configured to receive a plurality of deposited bills at one time and may include a first staging area 804 and a second staging area 806 for temporarily storing the plurality of deposited bills prior to storing. In these cases, a mixed denomination cassette 108 may store the plurality of deposited bills in a first staging area 804 and route each of the plurality of deposited bills one at a time past one or more internal sensors 518 to a second staging area 806. In this case, step 902 may consist of determining a denomination of each of a plurality of deposited bills and generating, by one or more processors, a secondary digital stack 813 comprising bill information including a denomination for each of the plurality of deposited bills.

It will be appreciated that additional information may also be provided in step 902 to make additional determinations, in addition to determining the denomination of a deposited bill. For example, quality data may be provided by one or more quality sensors 518 which may be used to determine a bill is non-recyclable (i.e., bill is too old or worn for recirculation).

At step 904, a storage position for the deposited bill is identified. As described above, in some embodiments a mixed denomination cassette 108 may be structured to receive one deposited bill at a time or in other embodiments to receive a plurality of deposited bills at a time. As such, step 904 may consist of identifying a storage position for one or more deposited bills. In some cases, a portion of step 904 may be performed by the host device 332 or at a central computing system (e.g., server 102), rather than by the mixed denomination cassette 108. In any case, the bill tracker 825 may identify a position within the primary digital stack 813 as a storage position for a deposited bill based on parameters such as a determined denomination for the deposited bill. In some embodiments, a storage position for a deposited bill may be identified as a position that is located adjacent to one or more bills having the same denomination. For example, a storage position may be identified for a deposited $5 bill that is located adjacent to two stored $5 bills. In this manner, deposited bills may be stored in groups of bills of matching denominations.

In other embodiments, a storage position for a deposited bill may be identified from a plurality of predefined storage positions. Each predefined storage position may be associated with a particular denomination or associated with two or more mixed denominations. As described above, a predefined storage position may be any position within a portion of the bill storage component 526 and the portion may be defined by relative boundaries (e.g., a first portion may start at a first end extending to a second portion and a second portion may start after a first portion extending to a second end). For example, a storage position for a deposited $10 bill may be identified from a predefined storage position associated with $10 bills. The predefined storage position may be defined as any position within a first portion of the bill storage component 526 starting at a first end and may contain up to fifty bills. Accordingly, the storage position for the deposited $10 bill may be identified as a 3. In other words the storage position for the deposited $10 bill may be identified, within the first portion of the bill storage component 526 associated with $10 bills, as the third bill from a first end. In another example, a storage position of a deposited $1 bill may be identified from a predefined storage position associated with $1, $5, $20, $50, and $100 bills. The predefined storage position may be defined as any position within a second portion of the bill storage component 526 starting after a first portion and extending up to a second end. Accordingly, the storage position for the deposited $1 bill may be identified as a 1. In other words the storage position for the deposited $1 bill may be identified, within the second portion of the bill storage component 526 associated with $1, $5, $20, $50, and $100 bills, as the first bill in the second portion.

At step 906, a picker system 828 of the mixed denomination cassette 108 traverses the bill storage component to the identified storage position 810 for the deposited bill. As described above, the processing circuit 502 may cause the picker system to traverse the bill storage component to the identified storage position 810 for the deposited bill. In other words, the processing circuit 502 causes the picker system to move to the identified storage position 810 for the deposited bill within the bill storage component 526. In some embodiments, a portion of step 906 is performed by the host device 332 or a central computing system (e.g., server 102), rather than the mixed denomination cassette 108. For example, a processing circuit 402 within the host device may cause the picker system 828 to traverse the bill storage component 526 to the identified storage position 810 for the deposited bill.

As described above, in some embodiments a mixed denomination cassette 108 may be structured to receive a plurality of deposited bills at a time. In some such embodiments, the plurality of deposited bills may be temporarily stored in a second staging area 806 while each of the plurality of deposited bills are stored in the bill storage component 526. In this case, process 900 continues from step 906 to step 912 for each of the plurality of deposited bills. For example, a $20 and a $5 bill may be temporarily stored within a second staging area 806 of a mixed denomination cassette 108. The picker system 828 may traverse to an identified storage position 810 of the $20 bill and complete steps 908-912 of process 900 to store the deposited $20 bill before traversing to the identified storage position 810 for the deposited $5 bill.

In some embodiments, the identified storage position 810 is validated at step 908. In some embodiments, where the identified storage position 810 is not validated, the step 908 is eliminated and the process 900 may proceed directly to step 910 where the picker system 828 stores the deposited bill.

At step 908, the identified storage position 810 is validated. As described above, the bill tracker 825 may be configured to cause the picker system 828 to validate an identified storage position 810 prior to storing one or more bills. During a validation, the picker system 828 may retrieve a bill at the identified storage position 810 and a denomination of the retrieved bill may be compared to the denominations of one or more bills within the primary digital stack 813 which are located adjacent to the storage position 810. A retrieval of a matching bill may indicate that the picker system 828 has traversed to the correct identified storage position 810 and may complete the validation. Alternately, a retrieval of a non-matching bill may indicate that the picker system 828 has traversed to an incorrect storage position and the bill tracker 825 may cause the picker system 828 to correct the incorrect storage position. The non-matching bill may be temporarily stored in a first staging area 804 and the picker system 828 may retrieve a subsequent bill from the storage position 810 for comparison. The bill tracker 825 may generate an updated primary digital stack 813 including bill information for the plurality of bills within the bill storage compartment 526 (i.e., reflecting the retrieval of the non-matching bill). In some embodiments, the bill tracker 825 may generate a secondary digital stack 813 comprising bill information for the non-matching bill including an original storage position within bill storage component 526 to track the non-matching bill temporarily stored in the first staging area 804. The picker system 828 may retrieve one or more subsequent bills until a matching bill is retrieved, completing the validation. In some embodiments, a validation may include a limit on the number of subsequent bills that the picker system 828 may retrieve.

In some embodiments, the picker system 828 may retrieve bills from one of a lower portion 816 or an upper portion 818 of the bill storage component 526 at a storage position 810. The picker system 828 may separate the bill storage component 526 into a lower portion 816 and an upper portion 818 using a splitting end 814 as described above. In this case the picker system 828 may retrieve bills from the lower portion 816 using a lower bill moving arm 822 and bills from the upper portion 818 using an upper bill moving arm 824.

In such embodiments the bill tracker 825 may determine an actual storage position of the picker system 828 (i.e., storage position associated with a retrieved non-matching bill) in response to retrieving a non-matching bill. As described above, the bill tracker 825 may retrieve the bill information associated with the non-matching bill from the primary digital stack 813 to determine the actual storage position from which the picker system 828 retrieved the non-matching bill. In this case the bill tracker 825 may use the actual storage position to determine a direction from the actual storage position in which the identified storage position is located. The processing circuit 502 may cause the picker system 828 to utilize either the lower bill moving arm 822 or the upper bill moving arm 824 to retrieve a subsequent bill in the determined direction. (i.e., cause a retrieval of a subsequent bill in the direction of the identified storage position).

At step 910, the picker system 828 stores the deposited bill in the identified storage position 810. In some embodiments, a bill validator 802 of the picker system 828 may store the deposited bill by routing it from the picker system 828 to the identified storage position within the bill storage component 526. In such embodiments, the identified storage position 810 may be a position that is in between the lower portion 816 and the upper portion 818 of the bill storage component 526. In this regard, the bill validator 802 stores the deposited bill by placing it in between the lower portion 816 and the upper portion 818 of the bill storage component 526. After storing the deposited bill, the picker system 828 may store the one or more bills temporarily stored during validation in the original storage positions they were retrieved from based on bill information stored in the secondary digital stack 813.

At step 912, a primary digital stack 813 comprising bill information including a denomination and a storage position for each of the plurality of bills stored within the bill storage component is generated. As discussed above, bill information may be stored in a table including rows for each stored bill and columns for storage position and denomination. At one or more times during process 900 the bill tracker 825 may store data such as a denomination or a storage position of the deposited bill to use in generating a primary digital stack 813 in step 912. The bill tracker 825 may generate a primary digital stack 813 by compiling the information for the previously stored bills from a previous digital stack 813 (i.e., generated before the deposited bill was stored) with the information associated with the deposited bill.

In some embodiments, the bill tracker 825 may determine a storage position for each of the plurality of stored bills as a number corresponding to the position of each bill relative to other bills. The storage positions for the plurality of stored bills may be determined from an ordered list of numbers starting with a position of 1 for the first bill stored at a first end, followed by a position of 2 for the next bill stored adjacent to the first bill, and so on. For example, the bill storage component 526 of a mixed denomination cassette 108 may contain the following bills in the following order, staring at a first end (i.e., a first end of the bill storage component), $5, $10, $1, $20, $10, $100. In this case, the $1 bill may have a storage position of 3 since it is the third bill from a first end. Additionally, a storage position for a deposited $5 bill may be identified as a 2 corresponding to the position between the $5 and $10 bills in the bill storage component 526.

In other embodiments, the bill tracker 825 may determine a storage position for a stored bill as a physical distance from a reference point (e.g., linear distance from a first end, radial distance from an origin, etc.) within the bill storage component 526. In such embodiments, the bill tracker 825 may perform various calculations using information received from the one or more sensors 518 to determine a storage position for each of the plurality of stored bills as a physical distance from a reference point at step 912. For example, the bill storage component 526 of a mixed denomination cassette 108 may contain the following bills in the following order, staring at a first end (i.e., a first end of the bill storage component), $5, $10, $1, $20, $10, $100. In this case, the bill tracker 825 may use data received from a fill level sensor 518 to determine an average bill thickness of 0.11 mm. The bill tracker 825 may use the average bill thickness to calculate storage positions for each of the bills as linear distances in millimeters from a first end of the bill storage component 526. The following storage positions of 0.11 mm for the $5, 0.22 mm for the $10, 0.33 mm for the $1, 0.44 mm for the $20, 0.55 mm for the $10, and 0.66 mm for the $100 may be determined.

It will be appreciated that additional information may also be included as part of the primary digital stack 813, in addition to the denomination and storage position for each of the plurality of bills stored within the bill storage component 526. For example, the primary digital stack 813 may include information indicating whether a bill has been determined to be non-recyclable. In this case bills determined non-recyclable may be excluded from the plurality of bills which may be retrieved for dispensing to a customer.

Referring now to FIG. 13, a process 914 may allow a mixed denomination cassette 108 to provide a bill of a specific denomination to a host device for dispensing. For example, process 914 may automatically identify, from a plurality of bills stored within a mixed denomination cassette 108, a target bill of a matching denomination associated with a transaction request, cause a picker system 828 to retrieve the target bill, validate the retrieved target bill, route the retrieved target bill to the host device 332, and generate an updated primary digital stack 813. In this regard, process 914 may retrieve a specific bill from the mixed denomination cassette 108 to provide to the host device 332 and process 914 may maintain the primary digital stack 813.

At step 916 a target bill associated with a transaction request is identified from the mixed denomination cassette 108. As described above, the bill tracker 825 may be configured to receive a transaction request from a host device 332 indicating a specific denomination for dispensing. The bill tracker 825 may be configured to identify a target bill, matching the specific denomination of the transaction request, from the primary digital stack 813. For example, the bill tracker 825 may receive a transaction request indicating a $20 bill for dispensing and identify a $20 bill located in a primary digital stack 813 of a mixed denomination cassette 108 as a target bill.

At step 918, a picker system 828 of the mixed denomination cassette 108 traverses the bill storage component 526 to retrieve the target bill. As described above, the processing circuit 502 causes the picker system 828 to traverse the bill storage component 526 to the storage position 810 of the target bill. In other words, the processing circuit 502 causes the picker system 828 to move to the storage position 810 of the target bill within the bill storage component 526. In some embodiments, a portion of step 906 is performed by the host device 332 or a central computing system (e.g., server 102), rather than the mixed denomination cassette 108. For example, a processing circuit 402 within the host device may cause the picker system 828 to traverse the bill storage component 526 to the storage position of the target bill.

In some embodiments, a retrieved target bill is validated to ensure the picker system 828 traversed to the correct storage position 810 and retrieved the correct target bill. In embodiments where a target bill is validated, process 914 may proceed to step 920, described in detail below.

In embodiments where the retrieved target bill is not validated, the target bill may be retrieved from the storage position 810 at step 918. In such embodiments, the mixed denomination cassette 108 may be structured to retrieve and dispense target bills (e.g., from the bill storage component 526') one at a time. In this case, step 918 may consist of a retrieval of one target bill and process 914 may proceed to step 924. In other embodiments, a mixed denomination cassette 108 may be structured to retrieve and dispense a plurality of target bills at one time and may include a second staging area 806 for temporarily storing the plurality of target bills prior to dispensing. In such embodiments, process 914 may proceed to step 922 where the retrieved target bill may be stored in a second staging area 806.

At step 920, a target bill is validated. In many regards, step 920 is significantly similar to step 908, described above, however during a validation of a target bill the picker system 828 may retrieve a bill at the storage position 810 of the target bill and a denomination of the retrieved bill may be compared to the specific denomination of the transaction request. A retrieval of a matching bill may complete the validation and step 920 may proceed to step 922. A retrieval of a non-matching bill may indicate that the picker system 828 has traversed to an incorrect storage position and the bill tracker 825 may cause the picker system 828 to correct the incorrect storage position. The non-matching bill may be temporarily stored in a first staging area 804 and the picker system 828 may retrieve a subsequent bill from the storage position 810 for comparison. The bill tracker 825 may generate an updated primary digital stack 813 including bill information for the plurality of bills within the bill storage component 526 (i.e., reflecting the retrieval of the non-matching bill). In some embodiments, the bill tracker 825 may generate a secondary digital stack comprising bill information for the non-matching bill including an original storage position within bill storage component 526 to track the non-matching bill temporarily stored in the first staging area 804. The picker system 828 may retrieve one or more subsequent bills until a matching bill is retrieved, thus completing the validation. In some embodiments, a validation may include a limit on the number of subsequent bills that the picker system 828 may retrieve.

In embodiments where the picker system may retrieve bills from one of a lower portion 816 or an upper portion 818 of the bill storage component 526, the bill tracker 825 may determine an actual position of the picker system 828 in a similar manner as in step 908 and in response to retrieving a non-matching bill. The bill tracker 825 may use the actual storage position to determine a direction from the actual storage position in which the target bill is located and may cause the picker system 828 to utilize either the lower bill moving arm 822 or the upper bill moving arm 824 to retrieve a subsequent bill in the determined direction. (e.g., cause a retrieval of a subsequent bill that is in the direction of the target bill).

After completing a validation of a retrieved target bill, the bill tracker 825 may cause the picker system 828 to store the one or more non-matching bills temporarily stored in the first staging area 804 in the bill storage component 526 in one or more original storage positions based on bill information stored in the secondary digital stack 813. In some embodiments, the bill validator 802 of the picker system 828 may store the one or more non-matching bills by routing the one or more non-matching bills to the one or more original storage positions the one or more non-matching bills were retrieved from.

In some embodiments, a mixed denomination cassette 108 may be structured to retrieve and dispense target bills (e.g., from the bill storage component) one at a time. In this case, step 920 may consist of a validation of one target bill and process 914 may proceed to step 924. In other embodiments, a mixed denomination cassette 108 may be structured to retrieve and dispense a plurality of target bills at one time and may include a second staging area 806 for temporarily storing the plurality of target bills prior to dispensing. In such embodiments, process 914 may proceed to step 922 where the retrieved target bill may be stored in a second staging area 806.

At step 922, the retrieved target bill is routed to the second staging area 806 for temporary storage while the picker system 828 retrieves the remaining target bills. The bill tracker 825 may generate an updated primary digital 813 stack including bill information for the plurality of bills within the bill storage component 526 (i.e., reflecting the retrieval of the target bill). In some embodiments, the bill tracker 825 may generate a secondary digital stack 813 comprising bill information for the target bill including an original storage position within bill storage component 526 to track the target bill temporarily stored in the second staging area. In embodiments where a mixed denomination cassette is structured to retrieve and dispense a plurality of target bills at one time, the bill tracker 825 may receive a plurality of transaction requests from the host device 332 at one time. In such embodiments, process 922 may complete steps 916-922 for each of the plurality of transaction requests to identify, retrieve, validate (i.e., in some embodiments), and store each target bill in the second staging area 806. In some cases, two or more target bills may be identified from adjoining storage positions and process 914 may skip step 918 (i.e., picker system 828 may already be at storage position of identified target bill) and may reduce the number of steps involved in step 920 (e.g., validation may be completed after one bill is retrieved). In other cases, two or more target bills may be identified from nearby storage positions which may reduce the time the picker system 828 spends traversing the mixed denomination cassette 108 in step 918. In these cases, the picker system 828 may retrieve and dispense bills more quickly and efficiently, reducing transaction times at the host device 332.

At step 924, the one or more retrieved target bills are routed to an I/O port 808 for transferring to a host device 332. As mentioned above, the I/O port 808 may be a bidirectional port configured to facilitate the routing of bills between the host device 332 and the mixed denomination cassette 108. In some embodiments, the I/O port 808 may be flexibly coupled to the picker system 828 via the bill path 826 to allow movement of the picker system 828 for traversing the bill storage component 526. In such embodiments, the one or more retrieved target bills may be routed to the I/O port 808 while the picker system 828 is in any position. In other embodiments, the I/O 808 port may be removably coupled to the picker system 828 via the bill path 826. In such embodiments, the one or more retrieved target bills may be routed to the I/O port 808 while the picker system 828 is in a coupled position. In this case, step 924 may consist of the picker system 828 traversing to a coupled position prior to routing the one or more retrieved target bills to the I/O port 808. In any case the one or more retrieved target bills may be routed from the I/O port 808 to the host device 332, fulfilling the one or more transaction requests.

At step 926, the bill tracker 825 generates an updated primary digital stack 813 comprising bill information including a denomination and a storage position for each of the plurality of bills stored within the bill storage component 526. As discussed above, bill information may be stored in a table including rows for each stored bill and columns for storage position and denomination. In many regards, step 926 is significantly similar to step 912, described above, however an updated primary digital stack 813 is generated after a retrieval of one or more target bills. The bill tracker 825 may generate an updated primary digital stack 813 by updating a previous primary digital stack 813 (i.e., from before the one or more target bills were retrieved) to include bill information for each bill currently stored in the bill storage component 526 after the retrieval of one or more target bills (i.e., retrieved bills are removed).

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory).

Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be provided as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for providing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure may be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A host device comprising:

an input/output (I/O) port;

a first sensor; and a non-transitory computer-readable medium comprising instructions stored thereon that, when executed by one or more processors, cause the one or more processors to:

determine that a cassette is docked with the host device based on data received from the first sensor;

receive a transaction request requiring a specific denomination for dispensing;

cause a picker system of the cassette to retrieve a target bill from a storage position of a bill storage component of the cassette based on the specific denomination for the transaction request and a storage position for a bill matching the specific denomination, wherein the cassette is configured to store a plurality of bills including the target bill, and generate a bill list comprising bill information for each bill of the plurality of bills including a respective denomination and the storage position for each bill, wherein retrieving the target bill from the storage position comprises separating the plurality of bills into an upper portion and a lower portion at the storage position of the target bill; and cause the I/O port to dispense the target bill based on the picker system retrieving the target bill from the storage position.

2. The host device of claim 1, wherein the host device is an automated teller machine, a teller station, a cash recycler, a point of sale system, or a vending machine.

3. The host device of claim 1, wherein the first sensor is configured to detect the cassette by capturing an identifier of the cassette.

4. The host device of claim 1, wherein retrieving the target bill from the storage position comprises determining, based on data from a second sensor of the cassette, the target bill based on identifying a denomination of the target bill as matching the specific denomination for the transaction.

5. The host device of claim 1, wherein the instructions, when executed by the one or more processors, further cause the one or more processors to determine an identification code for the cassette based on the data received from the first sensor.

6. The host device of claim 5, wherein the instructions, when executed by the one or more processors, further cause the one or more processors to send the identification code to a server associated with a provider institution.

7. The host device of claim 1, wherein the instructions, when executed by the one or more processors, further cause the one or more processors to send a parameter associated with the cassette to a server system associated with a provider institution, wherein the parameter comprises at least one of a fill level of the cassette or denominations of the plurality of bills stored in the bill storage component of the cassette.

8. A method comprising:

determining, by one or more processors of a host device, that a cassette is docked with the host device based on data received from a first sensor of the host device;

receiving, by the one or more processors, a transaction request requiring a specific denomination for dispensing;

causing, by the one or more processors, a picker system of the cassette to retrieve a target bill from a storage position of a bill storage component of the cassette based on the specific denomination for the transaction request and a storage position for a bill matching the specific denomination, wherein the cassette stores a plurality of bills including the target bill, and generates a bill list comprising bill information for each bill of the plurality of bills including a respective denomination and the storage position for each bill, wherein retrieving the target bill from the storage position comprises separating the plurality of bills into an upper portion and a lower portion at the storage position of the target bill; and causing, by the one or more processors, an input/output (I/O) port of the host device to dispense the target bill based on the picker system retrieving the target bill from the storage position.

9. The method of claim 8, wherein the host device is an automated teller machine, a teller station, a cash recycler, a point of sale system, or a vending machine.

10. The method of claim 8, wherein the first sensor detects the cassette by capturing an identifier of the cassette.

11. The method of claim 8, wherein retrieving the target bill from the storage position comprises determining, based on data from a second sensor of the cassette, the target bill based on identifying a denomination of the target bill as matching the specific denomination for the transaction.

12. The method of claim 8, further comprising determining, by the one or more processors, an identification code for the cassette based on the data received from the first sensor.

13. The method of claim 12, further comprising sending, by the one or more processors, the identification code to a server associated with a provider institution.

14. The method of claim 8, further comprising sending, by the one or more processors, a parameter associated with the cassette to a server system associated with a provider institution, wherein the parameter comprises at least one of a fill level of the cassette or denominations of the plurality of bills stored in the bill storage component of the cassette.

15. A non-transitory computer-readable medium comprising instructions stored thereon that, when executed by one or more processors of a host device, cause the one or more processors to:

determine that a cassette is docked with the host device based on data received from a first sensor of the host device;

receive a transaction request requiring a specific denomination for dispensing;

cause a picker system of the cassette to retrieve a target bill from a storage position of a bill storage component of the cassette based on the specific denomination for the transaction request and a storage position for a bill matching the specific denomination, wherein the cassette is configured to store a plurality of bills including the target bill, and generate a bill list comprising bill information for each bill of the plurality of bills including a respective denomination and the storage position for each bill, wherein retrieving the target bill from the storage position comprises separating the plurality of bills into an upper portion and a lower portion at the storage position of the target bill; and cause an input/output (I/O) port of the host device to dispense the target bill based on the picker system retrieving the target bill from the storage position.

16. The non-transitory computer-readable medium of claim 15, wherein the host device is an automated teller machine, a teller station, a cash recycler, a point of sale system, or a vending machine.

17. The non-transitory computer-readable medium of claim 15, wherein retrieving the target bill from the storage position comprises determining, based on data from a second sensor of the cassette, the target bill based on identifying a denomination of the target bill as matching the specific denomination for the transaction.

18. The non-transitory computer-readable medium of claim 15, wherein the instructions, when executed by the one or more processors, further cause the one or more processors to determine an identification code for the cassette based on the data received from the first sensor.

19. The non-transitory computer-readable medium of claim 18, wherein the instructions, when executed by the one or more processors, further cause the one or more processors to send the identification code to a server associated with a provider institution.

20. The non-transitory computer-readable medium of claim 15, wherein the instructions, when executed by the one or more processors, further cause the one or more processors to send a parameter associated with the cassette to a server system associated with a provider institution, wherein the parameter comprises at least one of a fill level of the cassette or denominations of the plurality of bills stored in the bill storage component of the cassette.

* * * * *